(12) United States Patent
Bohannon et al.

(10) Patent No.: US 7,984,297 B2
(45) Date of Patent: Jul. 19, 2011

(54) SYSTEM AND METHOD OF SPAM PROOF E-MAIL BOUNCE TRACKING

(75) Inventors: James John Bohannon, Pleasanton, CA (US); Andre Calvin Burgoyne, Berkeley, CA (US)

(73) Assignee: Mypoints.com Inc., San Francisco, CA (US)

( * ) Notice: Subject to any disclaimer, the term of this patent is extended or adjusted under 35 U.S.C. 154(b) by 1001 days.

(21) Appl. No.: 11/828,203

(22) Filed: Jul. 25, 2007

(65) Prior Publication Data

US 2008/0034432 A1    Feb. 7, 2008

Related U.S. Application Data

(60) Provisional application No. 60/820,342, filed on Jul. 25, 2006.

(51) Int. Cl.
*H04L 9/32* (2006.01)
(52) U.S. Cl. ........ 713/170; 713/155; 713/156; 713/157; 713/158; 713/159; 713/168; 705/67; 380/229; 726/22
(58) Field of Classification Search .......... 713/155–159, 713/168, 170; 380/229; 705/67; 726/22
See application file for complete search history.

(56) References Cited

U.S. PATENT DOCUMENTS

| | | | |
|---|---|---|---|
| 2004/0054887 A1* | 3/2004 | Paulsen et al. | 713/154 |
| 2004/0063442 A1* | 4/2004 | Goldberg | 455/458 |
| 2005/0076084 A1* | 4/2005 | Loughmiller et al. | 709/206 |
| 2007/0172066 A1* | 7/2007 | Davin | 380/262 |

OTHER PUBLICATIONS

The qmail-send Bounce Message Format (QSBMF), D. J. Bernstein, http://cr.yp.to/proto/qsbmf.txt, dated Feb. 1, 1997.
Some Bounces Handled by Ezmlm, D. J. Bernstein, http://cr.yp.to/docs/somebounces.html, dated: Aug. 4, 1997.

* cited by examiner

*Primary Examiner* — Christian LaForgia
*Assistant Examiner* — Roderick Tolentino
(74) *Attorney, Agent, or Firm* — Marshall, Gerstein & Borun LLP

(57) ABSTRACT

A system may account for the number of bounced e-mails by adding a number of records over the desired quantity to ensure that a minimum number of e-mails are not returned. To calculate an accurate number of extra records to identify, a system may need to track the percentage of messages returned and add a number of records equal to that percentage over the minimum number required by the particular campaign. However, unless the system accurately identifies a bounced e-mail as one originating from the system, spam or other unsolicited e-mail sent to the system may result in inaccuracies.

24 Claims, 18 Drawing Sheets

SYSTEM AND METHOD OF SPAM PROOF E-MAIL BOUNCE TRACKING

RELATED APPLICATION DATA

This application is related to U.S. Provisional Application Ser. No. 60/820,342 which was filed on Jul. 25, 2006, the entire disclosure of which is hereby incorporated by reference.

TECHNICAL FIELD

The following disclosure relates to a method for accurately tracking incoming bounced e-mails while excluding spam or other unsolicited e-mails.

BACKGROUND

Users of the World Wide Web distributed computing environment may freely send and retrieve data across long distances and between remote computing devices. The Web, implemented on the Internet, presents users with documents called "web pages" that may contain information as well as "hyperlinks" which allow the users to select and connect to related web sites. The web pages may be stored on remote computing devices, or servers, as hypertext-encoded files. The servers use Hyper Text Transfer Protocol (HTTP), or other protocols to transfer the encoded files to client users. Many users may remotely access the web sites stored on network-connected computing devices from a personal computer (PC) through a browser application running on the PC.

The browser application may act as an interface between user PCs and remote computing devices and may allow the user to view or access data that may reside on any remote computing device connected to the PC through the World Wide Web and browser interface. Typically, the local user PC and the remote computing device may represent a client and a server, respectively. Further, the local user PC or client may access Web data without knowing the source of the data or its physical location and publication of Web data may be accomplished by simply assigning to data a Uniform Resource Locator (URL) that refers to the local file. To a local client, the Web may appear as a single, coherent data delivery and publishing system in which individual differences between other clients or servers may be hidden.

A system may provide web site proprietors with web site user demographics information and is generally described in U.S. application Ser. No. 09/080,946, "DEMOGRAPHIC INFORMATION GATHERING AND INCENTIVE AWARD SYSTEM AND METHOD" to Bistriceanu et al., the entire disclosure of which is hereby incorporated by reference. Generally, the system may include users, web site proprietors, and an enterprise system hosting a central web site. The users may register with the central web site and may earn "points" for performing specific on- or off-line tasks in exchange for disclosing their demographic information during registration. The users may then redeem their earned points at participating proprietors for merchandise or services. Generally, the central web site manages the system by performing a number of tasks including: maintaining all user demographic information, tracking user point totals, and awarding points according to specific, proprietor-defined rules. Proprietors may effectively market their products or services to specific users based on the provided demographic information.

A demographic information gathering and incentive award system may encounter complications due to the empirical unreliability of member email deliverability. ISPs and other companies may obfuscate whether an email address is actually valid or not under some conditions in an effort to shield customers from unwanted e-mails or "spam." Further, it may be difficult or impossible to inquire to an ISP whether a given email address at an ISP domain is valid. However, one method of determining whether an e-mail address is invalid may be to send an email to the address and analyze a response if the e-mail is returned or "bounced." Responses may indicate that the email address doesn't exist, or its mailbox is full, or that the sender is blocked. Furthermore, due to bugs and misconfigurations, an ISP may incorrectly report that an email address doesn't exist depending on exactly which of the ISP's multiple email servers receive the email and the server configuration. An ISP may also accept the email and deliver it to the intended recipient, simply accept the email and silently discard it. In other situations, an email bounce may be misrouted and never be received by the sender.

In a demographic information gathering and incentive award system, marketers may desire to reach a minimum number of potential customers during a bulk e-mail campaign or test. However, as described above, many customer e-mail addresses may become inactive before a targeted e-mail can be sent, or the address may contain other errors that do not allow it to reach its intended recipient. A campaign that requires a minimum number of e-mails to be sent must ensure that the number of bounced e-mails does not force the total number of campaign e-mails sent by the system to fall below a desired quantity. Accurate tracking and analysis of bounced e-mails and information associated with the bounced e-mails may be helpful to ensure that the system accomplishes each campaign e-mail task. One method of accurately identifying bounced e-mails using encrypted header information may be described in "Variable Envelope Return Paths" by D. J. Bernstein at http://cr.yp.to/proto/verp.txt. However, past methods of identifying a message origin using encrypted header information may not be adapted for use within a demographic information gathering and incentive award system.

SUMMARY

A system and method of spam-proof e-mail bounce tracking may allow a user to accurately account for a percentage of returned messages. In one embodiment, the method may determine the rate of email bouncing over a sample size of a sufficiently large number of emails and a wide enough period of time to reliably conclude that an email address is not valid. Further, the method may stop sending emails to a member when the tested conclusion is sufficiently reliable. The system may include information in the header of each sent e-mail that may return a bounced message to a specific address. The system may then track the message information and accurately account for the number of bounced e-mails over one or more time periods. The method may then add a number of records over the campaign desired quantity to ensure that a minimum number of e-mails are sent for a task. To calculate an accurate number of extra records to identify, a system may need to track the percentage of messages returned and add a number of records equal to that percentage over the minimum number required by the particular campaign. The system may accurately identify the origin of an incoming, bounced e-mail to prevent spam or other unsolicited e-mail sent to the system from creating bounce tracking inaccuracies.

DETAILED DESCRIPTION

Figure 1:
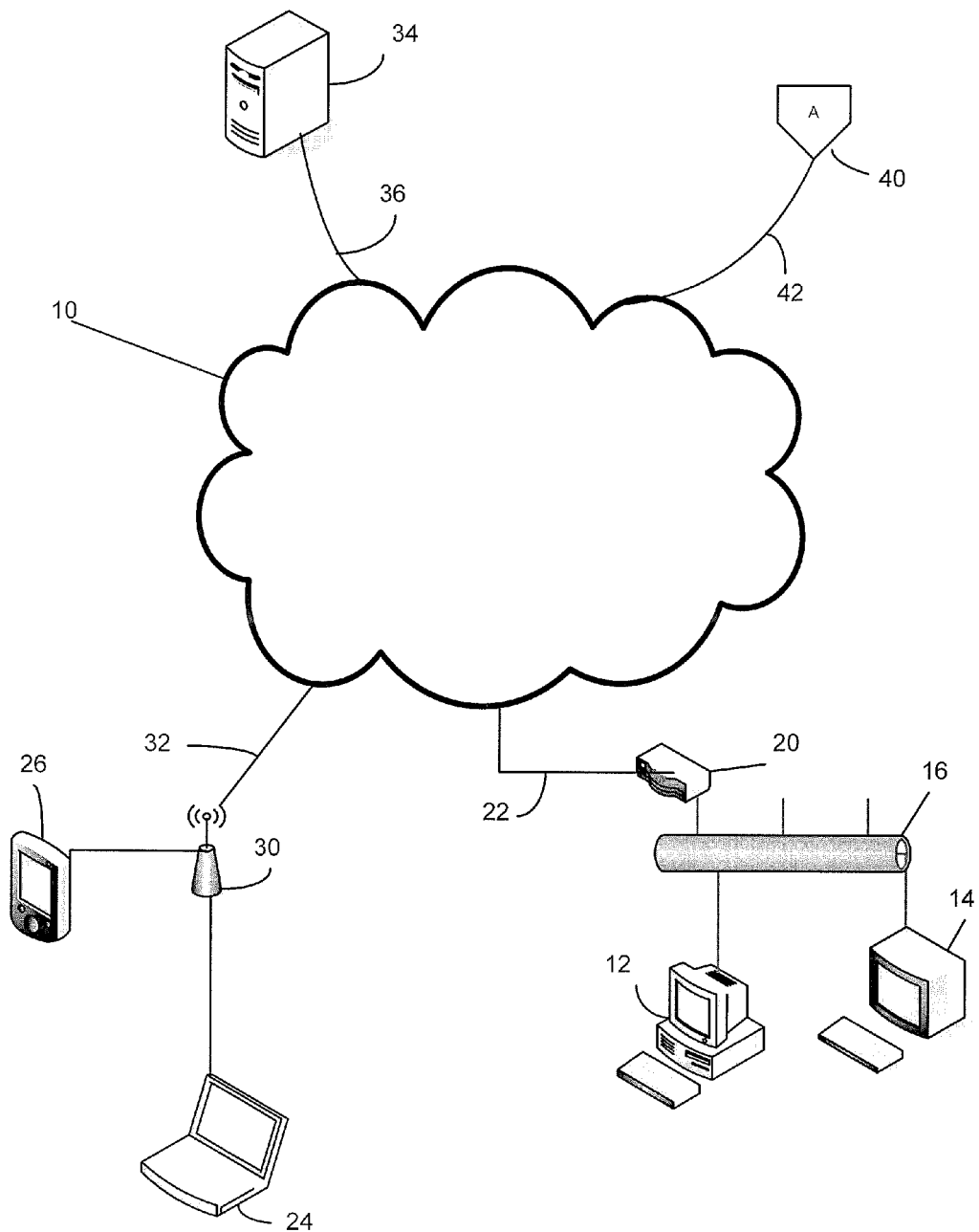
FIG. 1 is a diagram of one example of a network and network devices.

FIG. 1 illustrates an example of a network typical of the World Wide Web. A network 10 may be a virtual private network (VPN), or any other network that allows one or more computers, communication devices, databases, etc., to be communicatively connected to each other. The network 10 may be connected to a PC 12 and a computer terminal 14 via an Ethernet 16 and a router 20, and a land line 22. The network 10 may also be wirelessly connected to a laptop computer 24 and a personal data assistant 26 via a wireless communication station 30 and a wireless link 32. Similarly, a server 34 may be connected to the network 10 using a communication link 36. Also, an enterprise system 40 for awarding points to registered users in exchange for demographic information, as generally illustrated in FIGS. 3, 5, 7, and 8 may be connected to the network 10 using another communication link 42. Where the network 10 includes the Internet, data communication may take place over the network 10 via an Internet communication protocol. In operation, the client PC 12 may view or request data from any other computing device connected to the network 10. Further, the PC 12 may send data to any other computing device connected to the network 10.

Figure 2:
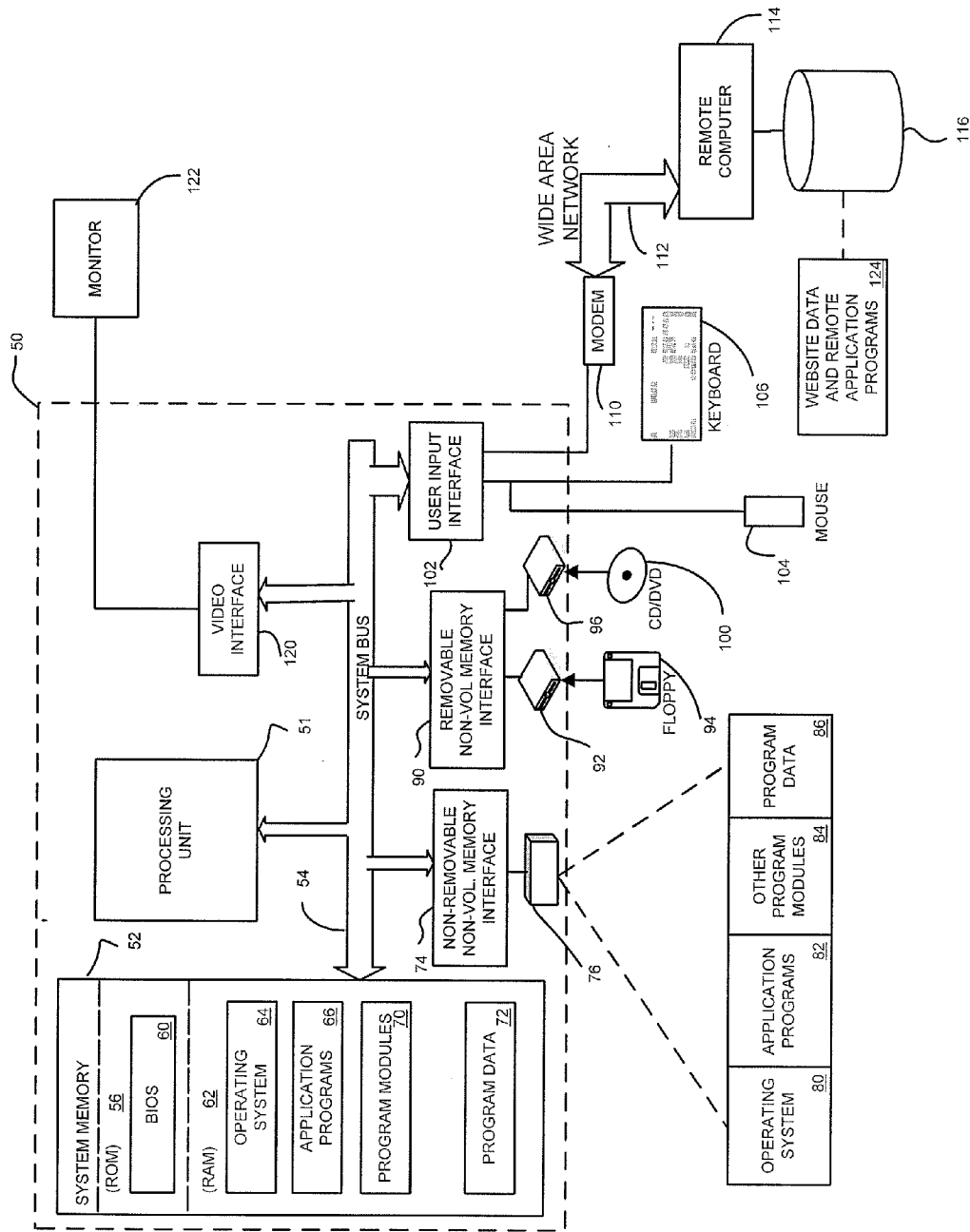
FIG. 2 is a diagram of one example of a general computing device that may operate in accordance with the claims.

FIG. 2 illustrates a typical computing device 50 that may be connected to the network 10 of FIG. 1 and participate in a distributed computing environment such as the World Wide Web. FIG. 2 may also be an example of an appropriate computing system on which the claimed apparatus and claims may be implemented, however, FIG. 2 is only one example of a suitable computing system and is not intended to limit the scope or function of any claim. The claims are operational with many other general or special purpose computing devices such as PCs 12, server computers 34, portable computing devices such as a laptop 24, consumer electronics 26, mainframe computers, or distributed computing environments that include any of the above or similar systems or devices.

With reference to FIG. 2, a system for implementing the steps of the claimed apparatus may include several general computing devices in the form of a computer 50. The computer 50 may include a processing unit, 51, a system memory, 52, and a system bus 54 that couples various system components including the system memory 52 to the processing unit 51. The system bus 54 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

Computer 50 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 50. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. The system memory 52 may include storage media in the form of volatile and/or nonvolatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72.

The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72.

The computer 50 may also include other storage media such as a hard disk drive 76 that may read from or write to non-removable, non-volatile magnetic media, a magnetic disk drive 251 that reads from or writes to a removable, non-volatile magnetic disk 94, and an optical disk drive 96 that reads from or writes to a removable, nonvolatile optical disk 100. Other storage media that may be used includes magnetic tape cassettes, flash memory cards, digital versatile disks, digital video tape, solid state RAM, and solid state ROM. The hard disk drive 76 may be connected to the system bus 54 through a non-removable memory interface such as interface 74. A magnetic disk drive 92 and optical disk drive 96 may be connected to the system bus 54 by a removable memory interface, such as interface 90.

The disk drives 92, 96 transfer computer-readable instructions, data structures, program modules, and other data for the computer 50 to different storage media 94, 100 for storage. A hard disk drive 76 may store an operating system 64, application programs 66, other program modules 70, and program data 72. These components may be the same or different from operating system 64, application programs 66, other program modules 70 and program data 72. The components associated with the hard disk drive 76 may be different copies than those associated with RAM 62.

The user may interact with the computer 50 through input devices such as a keyboard 106 or a pointing device 104 (i.e., a mouse). A user input interface 102 may be coupled to the system bus 54 to allow the input devices to communicate with the processing unit 51. A display device such as a monitor 122 may also be connected to the system bus 54 via a video interface 120.

The computer 50 may operate in a networked environment using logical connections to one or more remote computers 114. The remote computer 114 may be a PC 12, a server 34, a router 20, or other common network node as illustrated in FIG. 1. The remote computer 114 typically includes many or all of the previously-described elements regarding the computer 50, even though only a memory storage device 116 is illustrated in FIG. 2. Logical connections between the computer 50 and one or more remote computers 114 may include a wide area network (WAN) 112. A typical WAN is the Internet. When used in a WAN, the computer 50 may include a modem 110 or other means for establishing communications over the WAN. The modem 110 may be connected to the system bus 54 via the user input interface 102, or other mechanism. In a networked environment, program modules depicted relative to the computer 50, may be stored in the remote memory storage device 116. By way of example, and not limitation, FIG. 2 illustrates website data and remote application programs 124 as residing on the memory device 116. As may be appreciated, other means of establishing a communications link between the computer 50 and the remote computer 1140 may be used.

As previously described, the system may award users with redeemable points for many reasons, such as, in exchange for collecting and releasing user demographic information to proprietors or clients and for users taking any action associated with a "campaign," or set of rules negotiated by the proprietor. As used herein, a user or member may be any person, apparatus, method, or the like that employs a computing device 200 to access the system to earn redeemable points by completing proprietor-defined tasks in exchange for submitting and releasing demographic information to the system.

Further, as used herein, "demographic information" may be broadly construed and may include any kind of member descriptive data, any activity associated with a member, or any transaction associated with a member. Demographic information may be gathered by the system upon user registration in the form of a questionnaire designed to solicit various demographics data of interest to the proprietors. The questionnaire may be in the form of a website page or any other format able to collect demographics information from the user. Users may register in a variety of ways including direct registration at the central web site hosted by the enterprise system, registration through web site proprietors, a web based "refer-a-friend" program, third-party direct mailing, or other partner relationships. A user may need only to register with the system once. However, the user may earn additional points by completing future, supplementary questionnaires. Typical examples of information gathered by the questionnaires may be the user's age, income, occupation, etc. Further, the system may award a user for specific actions such as viewing web-based content, purchasing goods or services through a system-sponsored website, a proprietor's website, a proprietor's brick-and-mortar facility, or any other action associated with the system. The demographics information, to include but not limited to information gathered by questionnaire or records of any user action taken at the suggestion of or related to the system and a proprietor campaign, may be aggregated into a unique user profile. Once the user creates a profile, all future user activity within the system may be uniquely associated with the user's profile. A user may participate in the system by using a network 10 and a PC 12.

Further, as used herein, a proprietor or client may be any entity, corporation, web site manager, business owner, or the like that coordinates with the system by submitting a set of proprietor-defined award rules or tasks that a user may complete to earn redeemable points. The proprietor may also purchase user demographic information from the system and provide product price reductions or other benefits to users in exchange for user demographic information, or may complete any combination of these functions. This set of proprietor-defined rules or tasks may be called a "campaign." Each campaign may further include a template for e-mails to be sent by the system to targeted users. A proprietor may compensate the system for receiving the users' demographic information in a number of ways including: monthly sponsorship fees for the system displaying their offers on the central web site; per action fees when users follow specific actions provided to the system; per click fees for users clicking on hyperlinks provided in targeted e-mails advertising proprietor services or products and directing the user to a proprietor Web page; per e-mail delivery fees; advertisement placement within "newsletter" e-mails that the system may send to all system-registered users; and other fee combinations including indirect, agency relationships between proprietors and the system. Also, the system may compensate a proprietor for soliciting new memberships. The system may further automate billing clients based on a set billing rules within each campaign. The billing rules may be associated with award rules and user activity. For example, within a particular campaign, an award campaign rule may award a member two hundred points for making a single purchase with a proprietor. The campaign may also include a billing rule indicating that the proprietor may be billed at five percent one all purchases made by the member, even though only the first transaction awarded points. Also, a proprietor may customize its campaign to award a user points in a variety of methods. For example, a proprietor may choose the number of points to be awarded to users, may specify activities or questions that must be completed by the user before points are awarded, or may limit the frequency at which users can be awarded points for visiting the site. A proprietor may also dictate different user questionnaires during the registration process or may provide an additional questionnaire as a user task to be completed by the user to earn additional points.

Also, as used herein, the system may refer generally to the method or apparatus that coordinates user and proprietor functions by collecting user demographic information, awarding redeemable points to the users, tracking points for the users or proprietors, aggregating statistical information concerning user activity and the demographic information, maintaining the proper function of all user and proprietor activity, providing statistical and demographic information to the proprietors, sending targeted e-mail to the users, and executing any other management or coordination functions. The targeted e-mails may contain hyperlinks that direct users to proprietor offers that may award or redeem points to a specific user account. The system may be a collection of devices, typically general purpose computing devices 50, servers, 34, and data stores connected to and in communication with a user PC 12 through a network 10.

A system for collecting demographics information in exchange for awarding redeemable points may include a variety of structures and components as generally described in relation to FIGS. 3, 5, 7, and 8. Therefore, the system configurations described in relation to FIGS. 3, 5, 7, and 8 may include any combination of elements described in relation to each figure.

Figure 3:
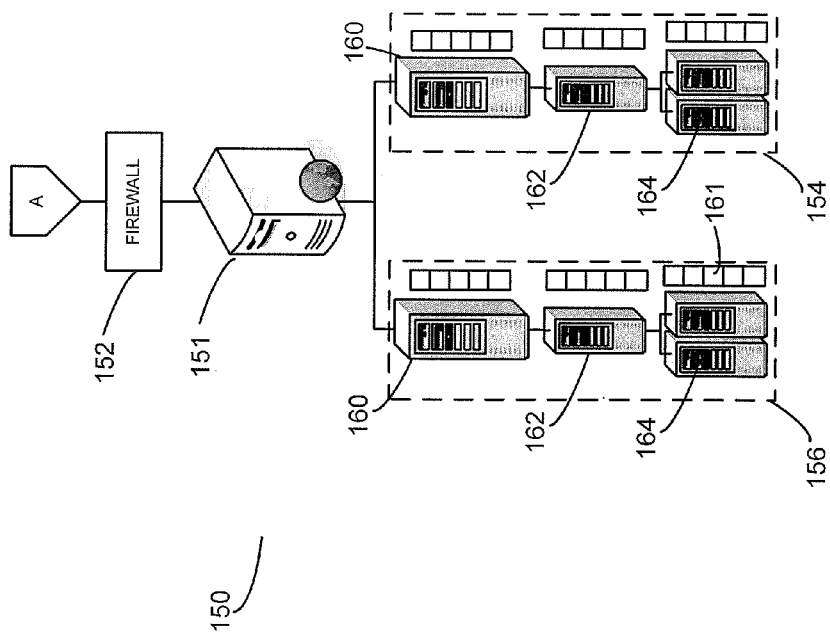
FIG. 3 is a diagram of one example of an enterprise system including two groups of servers, a web server, and a firewall as connected to the network of FIG. 1.

With reference to FIG. 3, the system 150 may include an architecture that is N-tier with a web server 151 in communication with a system firewall 152 through which a user may access a website hosted on the web server 151 by the system 150. The system firewall 152 may provide a secure, high-speed connection to a computer network such as the Internet as illustrated in FIG. 1. The web server 151 may face the users and communicate with a number of server groups or "silos" such as silo 154 and silo 156. A silo may be a conceptual collection of servers that work together through an application interface. Each silo may include, for example, an application server 160 that may execute a system application program 161.

With reference to FIG. 2 and FIG. 3, a system application program 161 running on the application server 160 may be an application program 66 or a remote application program 124 and may perform any coordination, transformation, or update process on the data entering or exiting the master data server 162. Further, a system application program 161 may execute on any general computing device 50 or any system 150 component. A system application program 161 running on the application server 160 may include, for example, any combination of an e-mail engine, a parameter engine, a validation engine, a crypto engine, an award engine, or a transaction engine.

Returning to FIG. 3, the application server 160 may communicate between the web server 151 and a master data server 162 to pass data from the web server 151 or to pass data generated by the system application programs 161 to the master data server 162 or any other system 150 element. The master data server 162 may include a portion of the total system 150 data, consisting of, for example, user demographic data, campaign data, and any other data used by the system 150. In turn, the master data server 162 may communicate with replication data servers 164. The replication data servers 164 may include a duplicate copy of the user profile data assigned to the silos 154, 156.

The system capacity is expanded simply by adding more silos 154, 156. The silos 154, 156 may also provide specialized functions within the system 300. For example, the silo 156 may be an administrative silo 156. The administrative silo 156 may be used by the system 150 to manage system information, campaign information, or any other information not related to the user profiles. The administrative silo 156 may also include a lookup table that may direct any data queries to the correct member silo 154. The administrative silo 156 may combine several different functions together, or it may be split apart into separate silos. For example, one administrative silo may contain campaign information while a separate administrative silo may contain a lookup table to direct any data queries to the correct member silo 154. Alternatively, there could be a third administrative silo which manages, for example, inventory information for redemptions. Thus, the administrative functions need not be confined to a single administrative silo. It should be noted that separating some functions into multiple administrative silos may increase the scalability of the system as a whole.

The member silo may hold the system 150 member information. The member information may include, for example, the user profile, demographics data, transactions, or point balances. As illustrated in FIG. 3, a system comprising one member silo 154 may hold approximately 100% of the total system 150 user information. Upon registration, a member's information may be stored in the member silo 154. The silo containing the member's registration data may be called the member's "home silo." Each member's information may be kept in the member's "home silo," and may remain in the home silo unless more member silos are added to the system 150.

Figure 4:
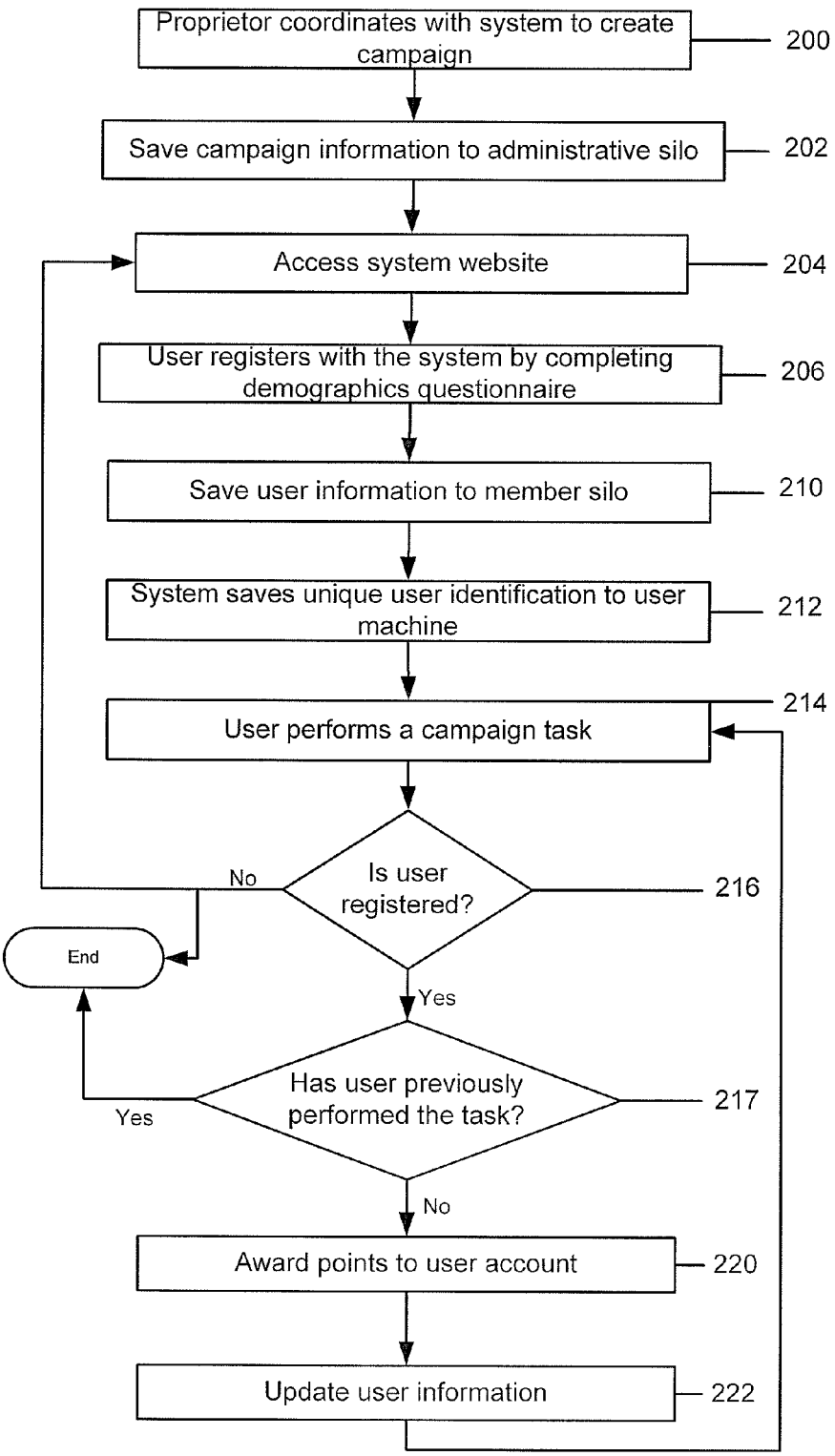
FIG. 4 is a flowchart describing a method of one example of using the system of FIG. 3 to award points in exchange for demographics information.

With reference to FIG. 1, FIG. 3, and FIG. 4, a method employing the enterprise system 300 may provide a user with a number of redeemable points for the user's submission of demographic information and participation in a variety of e-commerce related activities, including making purchases from proprietors. The user may then redeem their points for products and services from the participating proprietors such as retailers, theaters, restaurants, airlines, and hotels, among others. At step 200, a proprietor may coordinate with the system 150 to create a campaign For example, the proprietor may request information from the system 150 to target a specific demographic variable such as age, gender, income, or job. At step 202, the campaign information may be distributed to the silos 154, 156 and distributed across all system master data servers 162. At step 204, a user may login to the system 150 using a general purpose personal computer (PC) 12 connected to a network 10 such as the Internet.

As previously described, at step 206, the user may register with the system 150 by accessing a web site hosted by the system 150 at the web server 151. During registration, the user may complete a demographics questionnaire in the form of a web site or other electronic document. The demographics questionnaire may include various questions concerning the user's background including, for example, the user's age, sex, zip code, job title, or marital status. The system, 150 may collect the demographics data in a variety of formats including free form text, drop down menu selections, or Boolean values.

At step 210, the user's registration information and demographic data may be saved to a member silo 154. At step 212, the system may save a unique user identification to the user's PC 105. The unique user identification may be used by the system to associate proprietor campaign tasks and user actions to award points. The unique user identification may be encrypted in the form of a "cookie" associated with the user's browser that may be used to associate the user with the registration information stored on the administrative silo 156. Further, the system may assign a 64-bit random number to each user upon registration and associate that number with the member record on the system 150. Because of the extremely low statistical probability of assigning identical 64-bit random numbers to more than one member upon registration, the system 150 need not verify that the random number has been previously assigned. The random user identification assignment may allow the system 150 to more easily select random user demographic information for analysis. Particularly, because the numbers are randomly assigned, any set of records associated with a sequential selection of the random user identifier may be very unlikely to overlap with any other set chosen by the random number. Further, because the random numbers are only used for choosing a random set of members for statistical analysis, a small number of users with identical random numbers will not distort the results. Therefore, because the probability of the system 150 assigning identical 64-bit random numbers is very small, and a few identical numbers will have very little effect on statistical analysis, it may be unnecessary to ensure that a random number has not been previously assigned.

At step 214, the user may perform any of the tasks or actions specified in the proprietor's campaign stored on the administrative silo 156 to earn redeemable points. For example, a campaign task may be visiting the proprietor's web site or responding to a system 150 generated e-mail.

Each proprietor web site may include a visual cue that the web site is a member of the points-awarding program. The visual cue may include a hyperlink pointing to the web server 151. The hyperlink may include a code called an "cell identification" that may optionally be encrypted and may associate the user's selection of the hyperlink with a campaign task saved on the administrative silo 156. Further, the cell identification may provide information associated with all campaign rules. A user may also receive and select hyperlinks associated with a proprietor's campaign in an e-mail message generated by an e-mail engine running as a system application program 161 on the replication server 164.

The e-mail engine could alternatively be run on the application server 160. However, to increase efficiency, the e-mail engine may be run on one or more of the replication servers 164 on each member silo 154. In this way, the e-mail engine may communicate locally with the database, avoiding network traffic and also avoiding an additional load on the application server 160 which may also service member requests in real-time. Local communication between the e-mail engine and the database may be possible because the e-mail engine may work with a replicated copy of the member information. Further, local communication may provides for scalability, as additional replication servers 164 could be added. For example, the replication servers 164 could be increased from two to four so that more than one e-mail engine is running for a given member silo 154.

At step 214, the administrative silo 156 and the application server 160 may validate the user's registration with the award program by comparing the user's cookie file with the registration information stored on the administrative silo 156. The validation process may be performed by a validation engine running as a system application program 161 on the application server 160. If the information received by the application server 315 is encrypted, a crypto engine running as a system application program 161 on the application server 160 may decrypt the information. If the user is not registered, at step 216, the process may terminate or, alternatively, the user may be directed to the system registration web site at step 204. If the user is validly registered, the system 150 may proceed to step 217.

At step 217, the validation engine may determine if the user has previously completed the campaign task associated with step 214. As described above, awarding points may be conditional and defined by the proprietor campaign rules. The campaign tasks and rules may be defined by the proprietor and stored on the administrative silo 156 or distributed across all system 150 silos 154, 156. The tasks and rules may be indexed on the administrative silo 156 by the cell identification. Using the cell identification, the validation engine may determine that a particular cell identification has been previously used, also indicating that the user has previously performed the task and that the user is ineligible for additional points. If the user has previously performed the task, the system 150 may terminate or direct the user to perform a different task. If the user has not yet performed the task, the system may proceed to step 220.

At step 220, if the user is validly registered and has not yet performed the present campaign task, a transaction engine running as a system application program 161 on the application server 160 may award a predetermined number of points to the user's account saved on the member's home silo 154 by associating the campaign task, cell identification, and point quantity with the unique user identification.

At step 222, the transaction engine running as a system application program 161 on the application server 160 may update transaction information associated with the user at the member's home silo 154. Transaction information may later be used by the system 150 to develop demographic information and statistics associated with the user actions to provide to the proprietors. Therefore, upon visiting the proprietor site, the system 150 may automatically award points to the registered user without requiring the user to leave the proprietor web site. The system 150 may be distributed across multiple participating web sites and may operate without the knowledge of the user. Optionally, the proprietor's web sites may determine whether a web site visitor is one of the participating users.

The system 150 may also provide hyperlinks to redemption sites at which the users may convert earned points into products or services. The hyperlinks may be embedded in e-mails generated by the e-mail engine system application program 161. Further, the hyperlinks may point to redemption web sites hosted by the system 150 or on hosts at any other proprietor-designated site. The system 150 may automatically accept redemption orders, place purchase orders with vendors for the requested product or service, and may direct the proprietor or vendor to deliver the redeemed products to the user. The points may be automatically deducted from the user's account.

The system 150 may also develop demographic information and statistics to provide for the proprietors. The system 150 may associate the user demographic information with the users actions associated with the proprietor or any other web site. For example, the percentage of the males visiting a particular web site or web pages may be calculated by looking at each participating visitor in the member silo 154, checking a field in the member silo 154 for each member's sex, and tabulating the results.

Figure 5:
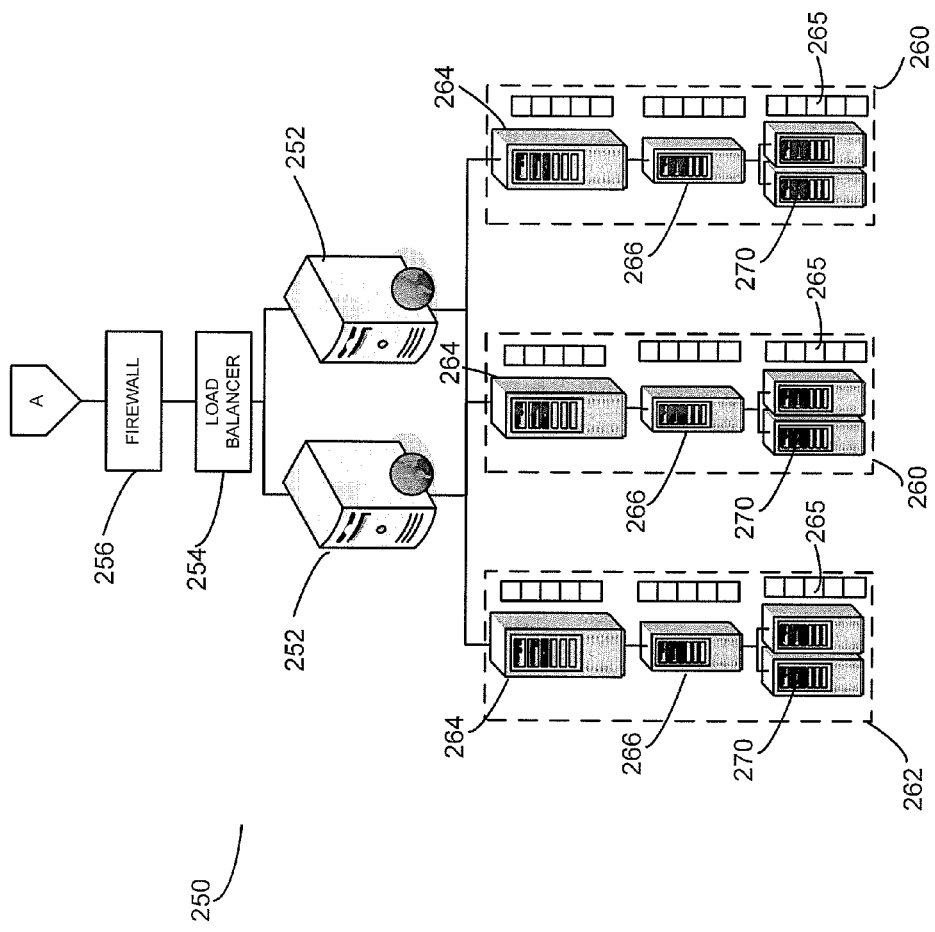
FIG. 5 is another diagram of one example of an enterprise system including a load balancer, a plurality of member server groups, and a single administrative server group.

With reference to FIG. 5, the system 250 may include a distributed architecture that is N-tier with web servers 252 that may communicate with a load balancer element 254, wherein the load balancer element 254 communicates with a system firewall 256 and the web servers 252. The load balancer 254 may randomly distribute all data entering the system 250 through the firewall 256 across the web servers 252. The web servers 252 may then determine a silo 260, 262 to send the data. Thus, upon the receipt of data, the load balancer 254 may select a random web server 252, and the randomly-selected web server 252 may forward the data to a specific silo 260, 262, or to a randomly-selected silo 260, 262. The randomly-selected silo 260, 262 may then determine whether to process the data or forward the data to another silo 260, 262. The load balancer's 254 random distribution of data may reduce data latency through the system 250. The load balancer element 254 may include a method executing on a general purpose computer 50 or on any device associated with the system 250 as either software or hardware.

The system firewall 256 may provide a secure, high-speed connection to a computer network such as the Internet as illustrated in FIG. 1. The web server 252 may face the users and communicate with a number of silos 260, 262. A silo may be a conceptual collection of servers that work together through an application interface. Each silo may include, for example, an application server 264 that may execute a system application program 265. A system application program 265 running on the application server 264 may perform any coordination, transformation, or update process on the data entering or exiting the master data server 266. Further, a system application program 265 may execute on any general computing device 50 in communication with the master data server 266. A system application program 161 running on the application server 160 may include, for example, any combination of an e-mail engine, a parameter engine, a validation engine, a crypto engine, an award engine, or a transaction engine. Each silo may include an application server 264, wherein the application server 264 may communicate between the web server 252 and a master data server 266, and the master data server 266 may communicate with replication data servers 270. The replication data servers 270 may include a duplicate copy of the user profile data assigned to a silo 260, 262.

The silos 260, 262 may provide simple system expandability by providing more silos 260, 262 to the system. The silos 260, 262 may also provide specialized functions within the system 250. For example, the silos 260, 262 may include an administrative silo 262 and member silos 260. The administrative silo 262 may be used by the system 250 to manage system information, campaign information, or any other information that may not relate to the user profiles. The administrative silo 262 may also include a lookup table that may direct any data queries to the correct member silo 260. The member silos 260 may hold an equal or approximately equal fraction of the total amount of user information contained in the system 250 as determined by the load balancer 254. As illustrated in FIG. 5, a system comprising two member silos may each hold approximately 50% of the total system 250 user information. Upon registration, a user's information may be stored on a single, randomly selected member silo 260. The silo containing the user's registration data may be called the user's "home silo." Each user's information may be kept in the user's "home silo," and may remain in the home silo unless the member silos 260 are rebalanced. By randomly assigning profiles to the silos, the system load may be balanced and the number of user profiles saved to a single member silo 260 may be no more than any other individual silo 260.

Figure 6:
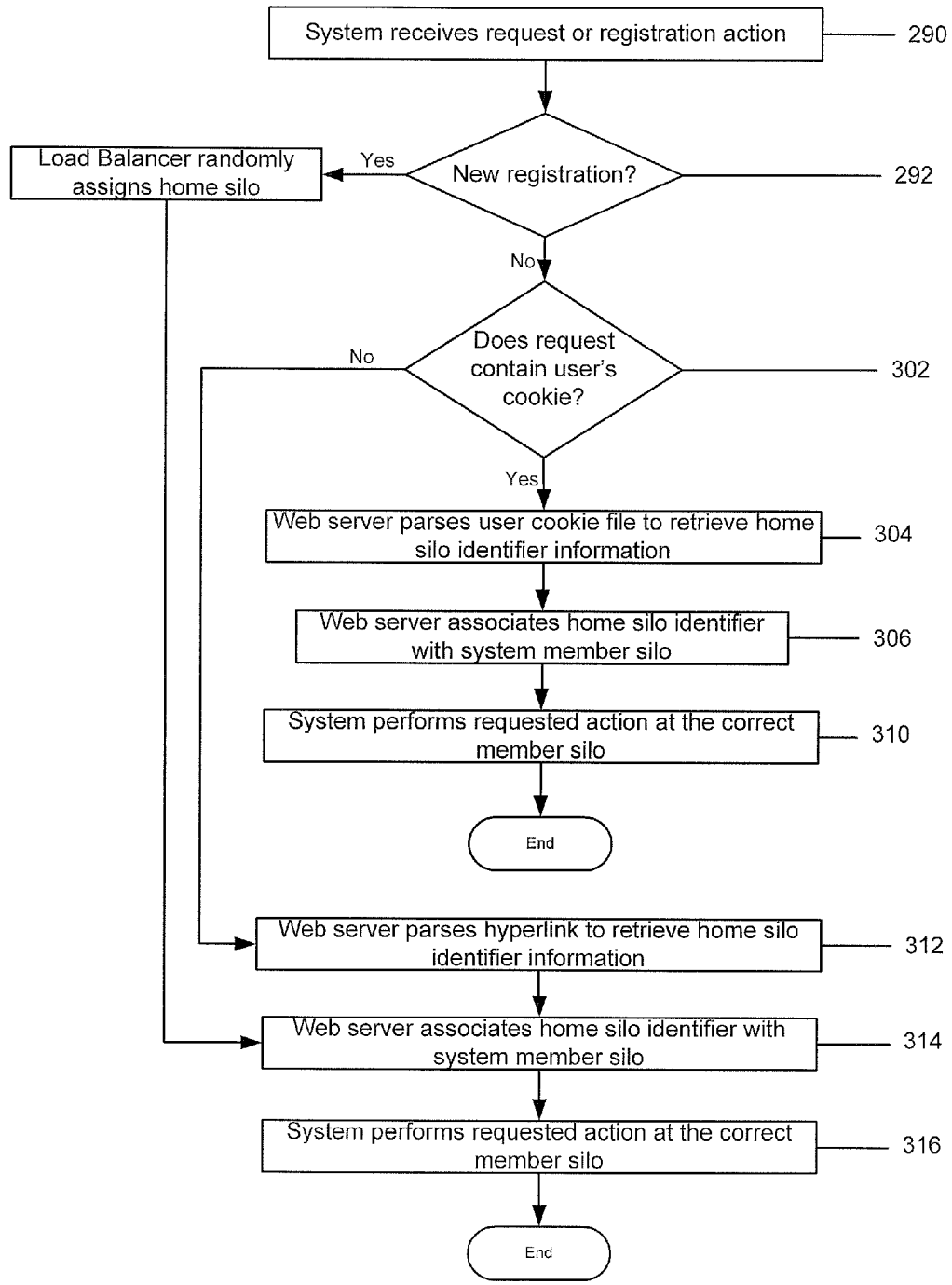
FIG. 6 is another flowchart describing a method of one example of using the systems of FIGS. 5, 7, and 8 to award points in exchange for demographics information.

With reference to FIG. 5 and FIG. 6, and as previously described in relation to FIG. 4, the system 250 may need to periodically retrieve or update member silo 260 data to the user's home silo. To correctly identify the user's home silo upon a retrieve or update action, the user's home silo identifier may be persistently stored in several different forms. Particularly, the home silo identifier may be part of a hyperlink in a bulk e-mail sent from the system 250 to the user. Further, the home silo identifier may be part of a URL stored at the user's computer, or may be part of a cookie file. The persistent storage of the user's home silo identifier on the user's computer may also reduce any system 250 overhead associated with finding the user's information. However, once the user is at the system 250, the home silo identifier is not needed to view any successive pages during a single session; the system only requires the home silo identifier upon the first action a user takes at the system 250 during the session. Therefore, the system 250 may acquire user's unique identification number and home silo identifier through encrypted information embedded in a hyperlink included in an e-mail or from any other source. By using the encrypted information, the user may not need to login to the system 250 to complete a transaction. A user may only need to explicitly login to the system 250 when the user visits the central website without going through a hyperlink containing the encrypted identification information and the user's browser does not contain an identifying cookie, or, when the user may perform a "sensitive" action associated with a user's private information or a transaction that may decrease the user's accumulated points.

The system 250 may identify not only the user's home silo but also cached user information through the use of an "application server session." During an application server 264 session, the system 250 may automatically store a cookie on the user's browser. The cookie may then be used to locate any cached information (including the user's home silo identifier) on successive page views. During an application server session, the cookie may be referred to as a "session cookie." Thus, while the user is actively at the system 250 and keeping his session with the system 250 open (i.e. does not end the session by closing the browser, deleting all browser cookies, or otherwise ending his session), the system 250 may not need to actively find the user's home silo identification. The system 250 may automatically forward requests to a user's home silo based on the user's application server 264 session. The system may automatically forward the requests using an Apache™ web server 252 with ModJK extensions to a Jetty™ Java™ servlet engine application server 264.

At step 290, the system 250 may receive a user login request, registration request, or update action. If, at step 292, the system 250 receives a new registration, the load balancer 254 may forward the data to a random web server 252 and the web server 252 may assign the registration information a random home silo identifier. By randomly assigning all registrants a home silo identifier, each member silo may contain an approximately equal amount of member information. Further, the data need not retain its home silo identification for its lifetime and may be distributed to other silos 260, 262 as needed for redistribution because no particular data characteristic may tie the data to a silo 260, 262.

After storing the new member information, the system 250 may proceed to step 314. The user request or update action may come from a hyperlink embedded in a targeted e-mail generated by the e-mail engine executing as a system application program 265 on the application server 264. The hyperlink may include the user's home silo identifier information, or alternatively, the action may originate from the user's browser and include the user's cookie file.

If, at step 292, the system 250 receives a non-registration request, the system may, at step 302, determine if the request contains the user's cookie file. At step 304, if the request contains the user's cookie file, the web server 252 may parse the user's cookie file to retrieve the user's home silo identifier information. At step 306, the web server 252 may associate the home silo identifier with a particular system 250 member silo 260. At step 310, the system 250 may perform the requested action at the user's home silo 260. Therefore, the system 250 may perform the action with the user's home silo 260 without performing a lookup or redirect action when the action includes the user's cookie file.

If, at step 302, the request does not contain the user's cookie file, the request likely originated from a system-generated hyperlink that was targeted to a particular user, or the user's browser may not contain the cookie file that correctly associates the user with the user's home silo. The hyperlink therefore may contain the user's home silo identifier 260. At step 312, the web server 252 may then parse the hyperlink to retrieve the user's home silo identifier information. At step 314, the web server may associate the home silo identifier with the correct member silo 260. Therefore, the system 250 may perform the action with the user's home silo 260 without performing a lookup or redirect action when the action originates from a hyperlink containing the user's home silo identifier.

Further, the user's cookie file may contain an inaccurate home silo identifier due to data redistribution or any other reason that may result in the user's data being moved to a location other than a location indicated by the cookie file. If the inaccurate information leads the action to an incorrect silo, the receiving member silo 260 may treat the action as if no browser cookie existed and perform a lookup action to re-direct the data to the correct silo and save a new, accurate, cookie file to the user's browser. Therefore, the system 250 may perform the action with the user's home silo 260 by performing a lookup or redirect action when the action includes an inaccurate cookie file.

Further, if the user's cookie is not set, the system may perform a lookup action by accessing the lookup table residing on the administrative silo 262. Also, if the member's cookie is not set or not present, the load balancer 254 may direct the user to a random member silo 260. A system application program 265 running on the application server 264 may parameter the master data server 266 or the replication data servers 270 to determine if the action relates to member information stored at that silo 260. If the member data is not stored on the silo 260, the application server 264 may broadcast a request to all silos 260, 262 to find the user's home silo. Once the user's home silo 260 is found, the system 250 generates a re-direct message to the user's browser to re-establish a connection to the system 250 through the web server 252 at the proper home silo 260. The user's browser may then re-establish a connection to the system 250 with a connection message containing the correct home silo 260 identifier. Once the web server 252 receives the re-connect request, user is directed to the proper home silo 260, and the transaction may continue. At step 316, the system 250 may perform the requested action at the correct member silo 260.

Figure 7:
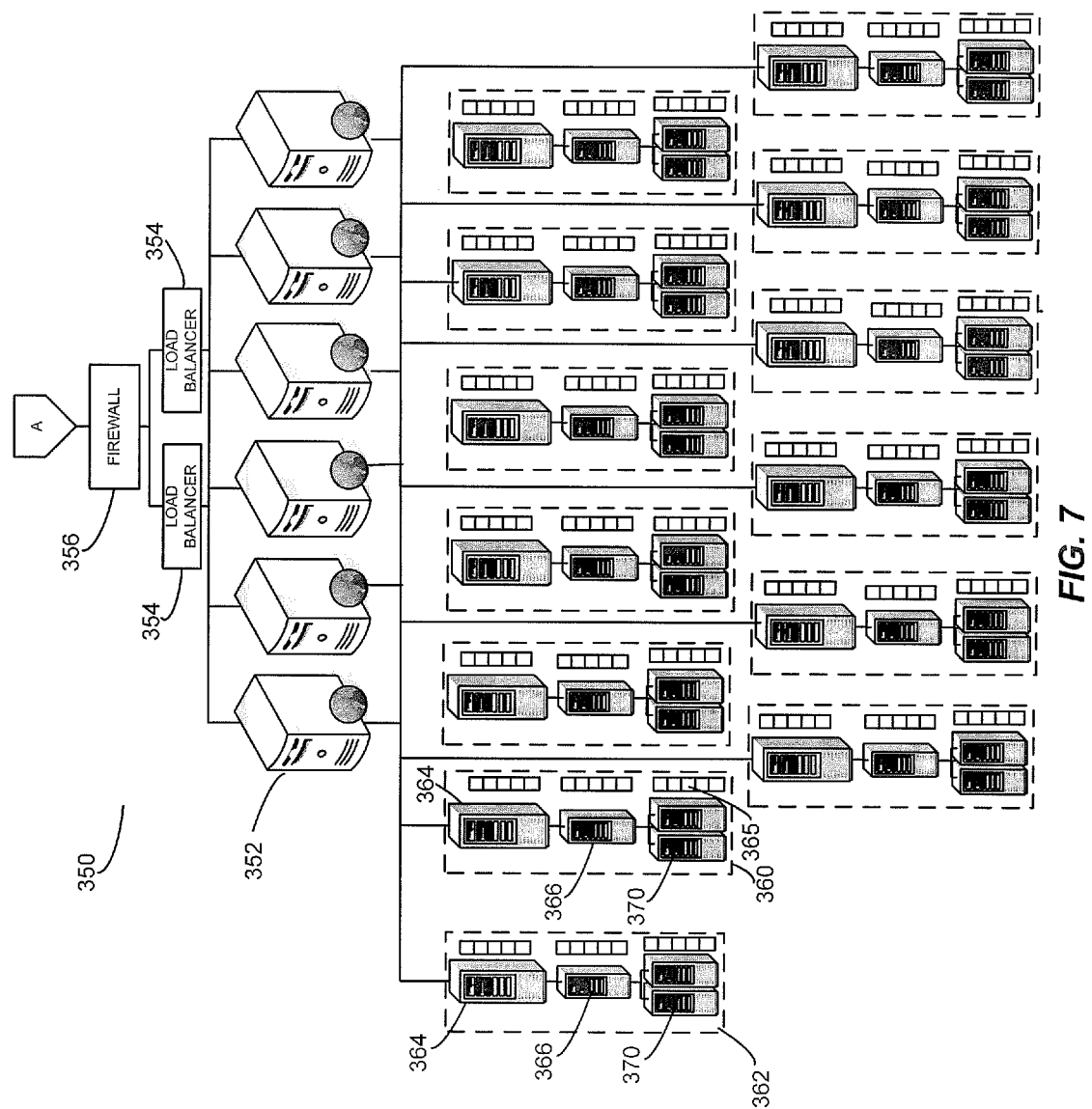
FIG. 7 is another diagram of one example of an enterprise system including twelve member server groups and a single administrative server group.

With reference to FIG. 7, the system 350 may also include a distributed architecture that is N-tier with six web servers 352 that may communicate with two load balancer elements 354, wherein the load balancer elements 354 communicate with a system firewall 356 and the web servers 352. The load balancer 354 may randomly distribute all data entering the system 350 through the firewall 356 across the web servers 352. The load balancer's 354 random distribution of data may reduce data latency through the system 350. The load balancer element 354 may include a method executing on a general purpose computer 50 or on any device associated with the system 350 as either software or hardware. The system firewall 356 may provide a secure, high-speed connection to a computer network such as the Internet as illustrated in FIG. 1. The web servers 352 may face the users and communicate with a number of silos 360, 362. A silo may be a conceptual collection of servers that work together through an application interface. Each silo may include an application server 364 executing a system application program 365, wherein the application server 364 may communicate between the web servers 352 and a master data server 366, and the master data server 366 may communicate with replication data servers 370. The master data server 366 and the replication data servers 370 may contain the member profile data to include demographic information, member transaction information, and all member-related data. Member transaction information may include records of every activity in which the member participates including registration information, purchase and activity tracking information, and point-earning information. A system application program 365 running on the application server 364 may perform any coordination, transformation, or update process on the data entering or exiting the master data server 366. Further, a system application program 365 may execute on any general computing device 50 in communication with the master data server 366. A system application program 365 running on the application server 364 may include, for example, any combination of an e-mail engine, a parameter engine, a validation engine, a crypto engine, an award engine, or a transaction engine. The replication data servers 370 may include a duplicate copy of the user profile data assigned to a silo 360, 362.

The silos 360, 362 may provide simple system expandability by providing more silos 360, 362 to the system. As illustrated in FIG. 7, the system may be expanded to 13 silos 360, 362. The silos 360, 362 may also provide specialized functions within the system 350. For example, the silos 360, 362 may include an administrative silo 362 and twelve member silos 360. The administrative silo 362 may be used by the system 350 to manage system information, campaign information, or any other information that may not relate to the user profiles. The administrative silo 362 may also include a lookup table that may direct any data queries to the correct member silo 360. The member silos 360 may hold an equal or approximately equal fraction of the total amount of user information contained in the system 350 as determined by the load balancer 354 random assignment. As illustrated in FIG. 7, a system comprising twelve member silos may each hold approximately 8% of the total system 350 user information. Upon registration, a user's information may be randomly stored in one member silo 360. The silo containing the user's registration data may be called the user's "home silo." Each user's information may be kept in the user's "home silo," and may remain in the home silo unless the member silos 360 may be rebalanced. By randomly assigning profiles to the silos, the system load may be balanced and the number of user profiles saved to a single member silo 360 may be no more than any individual silo 360.

Further, the member silos 360 may have differing storage capacities. The random distribution of data stored on each member silo 360 may then be based on the percentage of system capacity represented by a particular member silo 360 by weighting the preference of the web server 352 to select a home silo 260 upon registration. Thus, a silo 360 having twice the capacity as another silo 360 may be given twice the weighting during random selection. Each user's information may be kept in the user's "home silo," and may remain in the home silo unless the member silos 360 may be rebalanced. By randomly assigning profiles to the silos, the system load may be balanced and the number of user profiles saved to a single member silo 360 may be no more than any individual silo 360. Also, each silo 360 may poll the system 350 to determine its percentage of system capacity. Instead of random home silo selection, a closed-loop selection mechanism may, for new registrations or anonymous requests, prefer the silo 360 with the least-utilized capacity. Capacity may be measured by any suitable function and may take into account, for example, the amount of disk space available, the system processing load, the I/O capacity, the number of members, or other factors.

Figure 8:
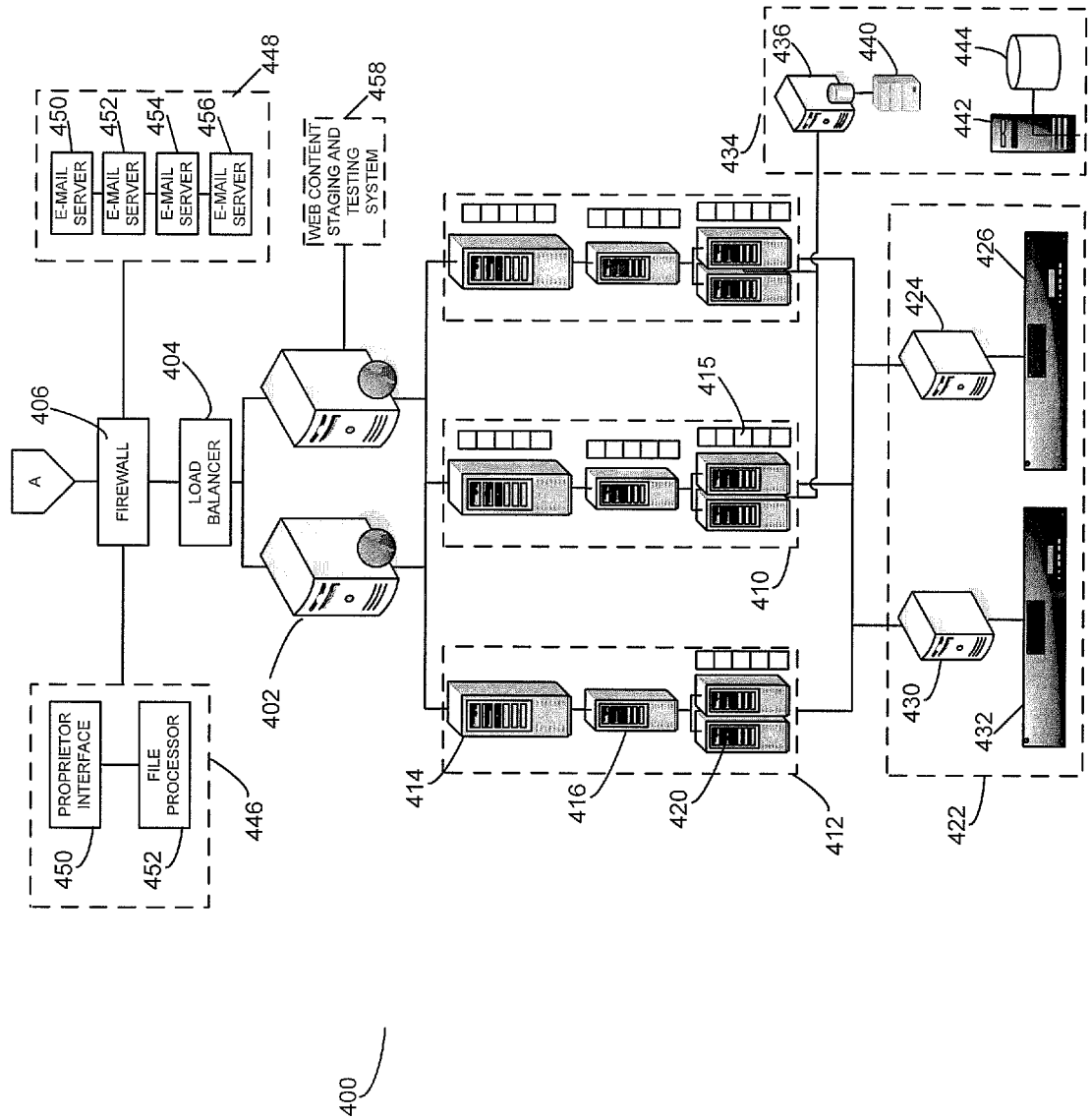
FIG. 8 is another diagram of one example of an enterprise system including a plurality of member server groups, a single administrative server groups, and several components and systems that may enhance system function.

With reference to FIG. 8, the system 400 may also include several components that may complement the awarding of points as previously described. Further, the components may also be added to any of the systems 150, 250, 350 as previously described. As described above, the system 400 may include a distributed architecture that is N-tier with web servers 402 that may communicate with a load balancer element 404, wherein the load balancer element 404 communicates with a system firewall 406 and the web servers 402. The load balancer 404 may randomly distribute all data entering the system 400 through the firewall 406 across the web servers 402. The load balancer's 404 random distribution of data may reduce data latency through the system 400. The load balancer element 404 may include an application executing on a general purpose computer 50 or on any device associated with the system 400 as either software or hardware.

The system firewall 406 may provide a secure, high-speed connection to a computer network such as the Internet as illustrated in FIG. 1. The web server 402 may face the users and communicate with a number of silos 410, 412. A silo 410, 412 may be a conceptual collection of servers that work together through an application interface. Each silo 410, 412 may include an application server 414 executing a system application program 415, wherein the application server 414 may communicate between the web server 402 and a master data server 416, and the master data server 416 may communicate with replication data servers 420. A system application program 415 running on the application server 414 may perform any coordination, transformation, or update process on the data entering or exiting the master data server 416. Further, a system application program 415 may execute on any general computing device 50 in communication with the master data server 416. A system application program 415 running on the application server 414 may include, for example, any combination of an e-mail engine, a parameter engine, a validation engine, a crypto engine, an award engine, or a transaction engine. The replication data servers 420 may include a duplicate copy of the user profile data assigned to a silo 410, 412.

The silos 410, 412 may provide simple system expandability by providing more silos 410, 412 to the system. The silos 410, 412 may also provide specialized functions within the system 400. For example, the silos 410, 412 may include an administrative silo 412 and member silos 410. The administrative silo 412 may be used by the system 400 to manage system information, campaign information, or any other information that may not relate to the user profiles. The administrative silo 412 may also include a lookup table that may direct any data queries to the correct member silo 410.

The member silos 410 may hold an equal or approximately equal fraction of the total amount of user information contained in the system 400 as determined by the load balancer 404. As illustrated in FIG. 8, a system comprising two member silos may each hold approximately 50% of the total system 400 user information. Upon registration, a user's information may be randomly stored in one member silo 410. The silo containing the user's registration data may be called the user's "home silo." Each user's information may be kept in the user's "home silo," and may remain in the home silo unless the member silos 410 may be rebalanced. By randomly assigning profiles to the silos 410, 412, the system load may be balanced and the number of user profiles saved to a single member silo 410 may be no more than any individual silo 410.

Further, the silos 410, 412 may collectively communicate with a backup system 422. The backup system 422 may store a duplicate copy of all data stored in the system silos 410, 412. The backup system 422 may include a very high memory capacity server including a primary backup server 424. An example of a very high memory capacity server 424 may be a 2 TB array server. The primary backup server 424 may communicate with a high capacity data cache 426. An example of a high capacity data cache may be a 21 slot, 2-drive LTO2 tape library such as the Exabyte® Ultrium™ family of LTO tape drives. The backup system 422 may further include a secondary backup server 430. The secondary backup server 430 may also be a 2 TB array server. The secondary backup server 430 may also communicate with a secondary high capacity data cache 432. An example of a secondary high capacity data cache may be an LTO3 tape drive such as the Quantum® LTO-3 drive.

The member silo 410 replication data servers 420 may collectively communicate with a data warehouse system 434. The replication data servers 420 may communicate with a database server 436. The database server 436 may include an extract/transform/load (ETL) server. The database server 436 may communicate with a data warehouse server 440. The data warehouse server 440 may include a 2 TB array. The data warehouse system 434 may also include legacy data related to prior versions of the points-awarding system 400. The legacy data may be stored in a modular workgroup server 442 such as the Sun Microsystems® E420R. The workgroup server 442 may further communicate with one or more data stores 444 containing the legacy data.

A proprietor interface system 446 may also communicate directly with the system 400 through the system firewall 406. The proprietor interface system 446 may allow a proprietor to directly access user data stored on the system silos 410, 412. This access may allow the proprietors to collect demographic and statistical information concerning the user data on the silos 410, 412. The proprietor interface system 446 may include a proprietor interface 450. The proprietor interface 450 may be a secure connection to allow the proprietors to upload or download data to the system 446. The proprietor interface 450 may employ a protocol enabling the secure transmission of web pages such as hypertext transfer protocol over a secure socket layer (https).

The proprietor interface 450 may be in communication with a file processing element 452. The file processing element 452 may allow proprietors to access the system 400 to shop for demographics information or to store and process client information or added demographics questions for use during user registration. Proprietors may also upload member activity which is stored as member transactions in the member's home silo and which may, further, trigger both billable activity transactions and award transactions in association with each particular member and each particular campaign.

An e-mail relay system 448 may also communicate with the system 400 though the firewall 406. The e-mail relay system 448 may include four servers 450, 452, 454, 456 in communication with the system 400. The e-mail relay system 448 may direct incoming e-mails, such as delayed bounces from outgoing bulk mails sent by the system, to the proper components of the system 400.

A web content staging and testing system 458 may also communicate with the system in a variety of methods. For example, the web content staging and testing system 458 may communicate with the system 400 through the web severs 402. The web content staging and testing system 458 may comprise a number of general computing devices 50 that may provide a secure and efficient environment for system 400 administrators to develop a variety of data for the system 400 before the data may be deployed live.

Figure 9:
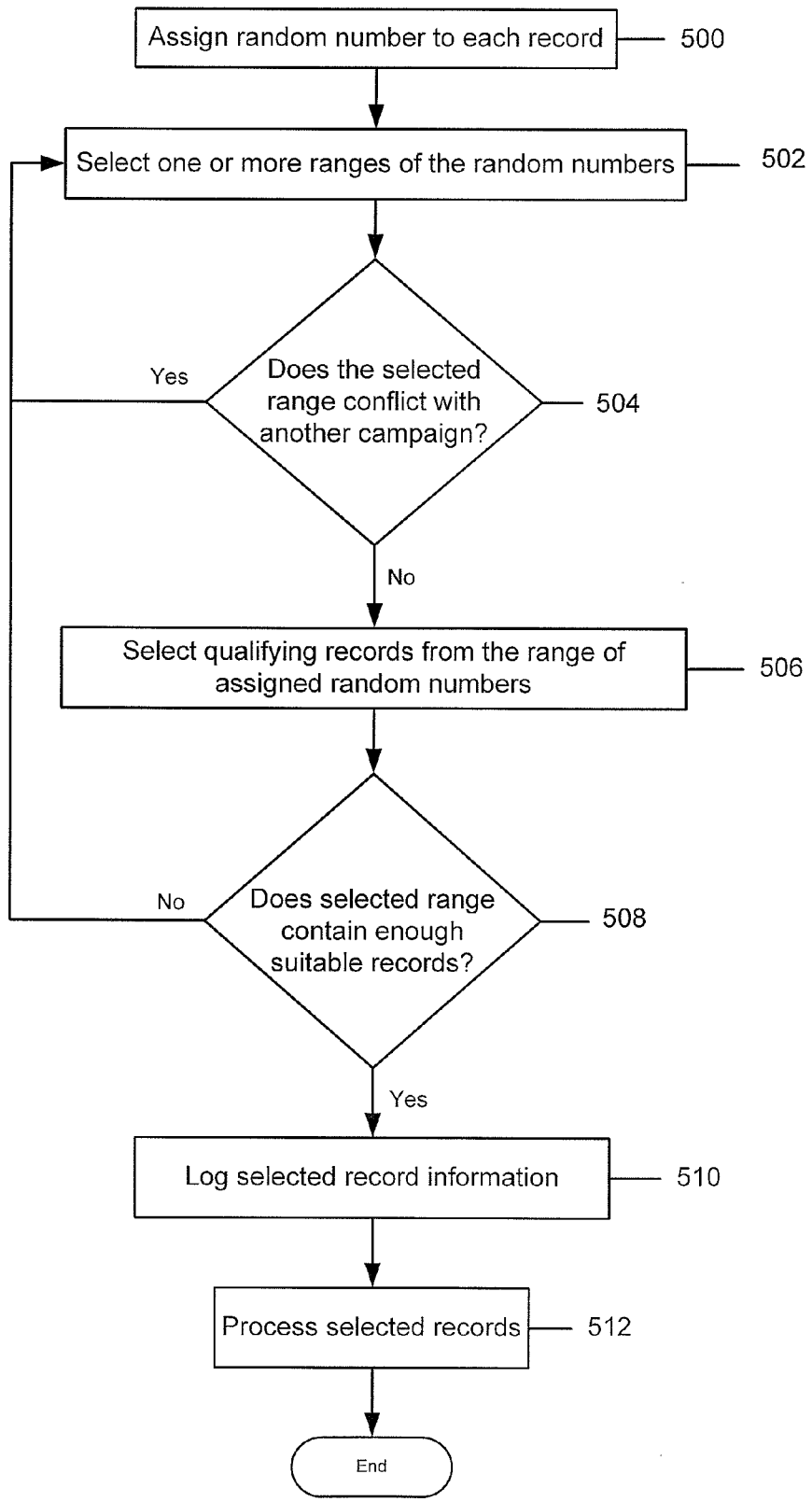
FIG. 9 is flowchart describing a method of one example of target parameter selection ranging using the member server groups of FIGS. 5, 7 and 8.
Figure 10:
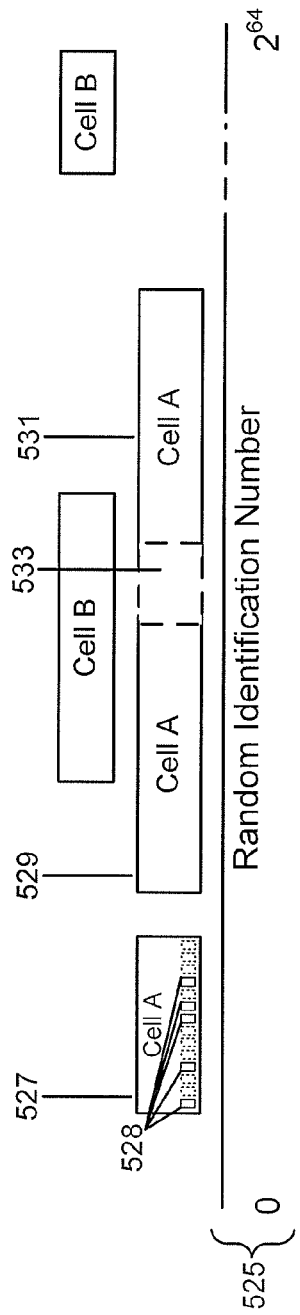
FIG. 10 is a graphical representation of one method of efficient target query selection ranging.

With reference to FIG. 8, FIG. 9, and FIG. 10, a user may select a number of disjoint record sets without performing a database join or saving and comparing multiple record sets. In one embodiment, at step 500 of FIG. 9, the system 400 assigns each member record one or more persistent identifiers. A persistent identifier may be a record parameter that does not change during the lifetime of the database record. For example, while a user may change certain record parameters, such as the member's address or a particular interest, a persistent identifier may reliably be associated with the record without modification during the lifetime of the record. As described above in relation to FIG. 4, one example of a persistent identifier may be a very large, randomly-generated number assigned at the time of record creation. A 32 or 64-bit random number may offer a sufficiently large range of possible numbers to assign, with a high degree of certainty, a unique random number to each record. Another example of a generating a substantially unique persistent identifier may be applying a hash algorithm, for example, Message-Digest algorithm 5 (MD5), to a demographic value that is unique to a member (i.e., a social security number). The system 400 may choose a random number within the large range of random numbers and assign it to the record. Because the range of possible persistent identifiers is sufficiently large, the system 400 may avoid checking for records that have been assigned the same persistent identifier. The random number may be larger or smaller than 64-bits. The random persistent identifier may also be alphabetic, alphanumeric, or any symbol or combination of symbols that may be fully ordered. Because the system 400 may assign each member a random number between 0 and $2^{64}$, records may be randomly distributed along a range of the random numbers. This range is shown in FIG. 10 and identified with the reference number 525.

At step 502, a user may select a number of records (527 in FIG. 10) associated with a range of the persistent identifier 525. The number of records may not be associated with contiguous ranges of persistent identifiers and may encompass several different ranges 527, 529 across the entire range 525.

At step 504, the system 400 may determine if the selected range conflicts with another campaign range. For example, the system 400 may associate every selected range with a single campaign. As previously described, for some aspects of AB Testing, the sets of selected records are disjoint. For example, a campaign including three disjoint record sets 527, 529, 531, must ensure that no selected range overlaps with one of the other sets. Expansion 533 of any of the sets 529 to include a wider range of records identified by the persistent identifier may inadvertently encompass the ranges of the other related sets 531. Also, any records added to a first campaign that originally excluded a second campaign's records may mistakenly add records that conflict with the second campaign. If, at step 504, the selected range conflicts with another previously-selected range, the method may return to step 502 to select another range of persistent identifiers. If, at step 504, the selected range does not conflict with another campaign, the system 400 may proceed to step 506. One method for ensuring that the selected ranges do not overlap may take advantage the persistent identifier's ordering. For example, the method may compare a first ordered range to a second ordered range, wherein the first range comprises records with a lower-ordered set of the persistent identifier than the second range. The method may truncate the second range by the highest value of the first range's persistent identifier. For example if persistent identifiers of the first range are 1000 to 2000, while the second range persistent identifiers are 1700 to 3000, the method may truncate the second range by substituting 2000 for 1700 as the lowest persistent identifier of the second range. Therefore, the method may associate records having persistent identifiers within 1000 to 2000 with the first range and records having persistent identifiers within 2000 to 3000 with the second range. To compensate for the records truncated from the range, the method may add another (possibly not contiguous) range to include in the set of ranges, for example, 3500 to 3800.

At step 506, a user may select a number of qualifying records 528 (shown in FIG. 10) within the range of persistent identifiers. The selected qualifying records may contain parameters that satisfy a marketing campaign requirement. For example, the selected range 527 may include a total of 36,000 records. Of the selected 36,000 records, only 1,200 records may contain parameters that are desirable for a particular campaign.

Still referring to FIG. 9, at step 508, the selected range of records 527 may be inspected to ensure that it contains a desired number of suitable records. For example, if the desired number of records is 1,500 and the range 527 only contained 1,200 records, then the method may return to step 502 to select a larger range 529 (shown in FIG. 10). The method may also select one or more non-contiguous ranges to select a desired number of records. The system 400 may increase the number of records it retrieves to compensate for a calculated number of e-mail messages that are returned or "bounced" back to the system as being undeliverable. For example, the system 400 may track the percentage of e-mails that are bounced and add a number of records to be retrieved equal to that percentage. The system 400 may determine an amount to expand the previous range or select a new range that is not contiguous to the previous range by calculating an error from the desired number of records. In one embodiment, the system 400 may track bounce information as it sends the e-mails and adjust the total number of e-mails planned for delivery before system completes the send task. Therefore, at the end of each send task, the system may have adequately compensated for all bounced messages. In a further embodiment, the system 400 records historical trends regarding the bounced e-mails. In the further embodiment, the system 400 may predict an expected bounce rate for a new campaign and calculate a number of targeted e-mails before beginning a send task.

The system 400 may also increase the range of identifiers selected to account for a low return from a first selection of a range of persistent identifiers. For example, if the method returned 1,200 records from the first selected range out of a desired 1,500 records, the first range had an error rate of 25%. Therefore, because of the random distribution of members in the database, a next selected range may be increased by 25% to return approximately the desired number of entries. If the range 527 contained approximately the desired 1,500 records, then the method may return the desired records to the user for immediate campaign processing. The number of suitable records actually processed may vary slightly from the exact number of desired records. The range of variance may be the result of a statistical analysis that determines the possible accuracy of a campaign test given the number of qualifying records within the selected ranges. For example, the system 400 may determine that a return of 1,495 or 1,550 out of the desired 1,500 records is statistically reliable.

At step 510, the system 400 may log information associated with the selected records. For example, the system 400 may modify a record parameter that identifies all campaigns or campaign tasks associated with that record. Alternatively, the system 400 may record the range of the persistent parameter used in the particular campaign task with other information associated with the campaign.

At step 512, the system 400 may process and complete the campaign task without saving a list of records selected by the method. In one embodiment, the campaign task includes sending an e-mail message to an address included as a parameter of a record selected at step 506. Depending on the system 400 resources or any other scheduling factor, the system 400 may send the messages to the e-mail accounts associated with the selected records over an extended period of time. For example, the system 400 may send 100,000 e-mails for ten consecutive days. Over the course of that period, the selected records may change. The system may account for any changes to the number of available records during this time by adjusting the bounce rate percentage of step 508. The system may also account for changes in the available number of records by extending the previously-selected ranges or adding additional ranges, ensuring that selected sets of records remain mutually exclusive, when needed.

By running more ranging iterations as in steps 504 and 508, the system 400 may consume more resources, but may also more accurately return the number of desired records. Further, a number of returned records that is closer to the desired number of records may result in more records being free for other campaigns or tests.

Figure 11:
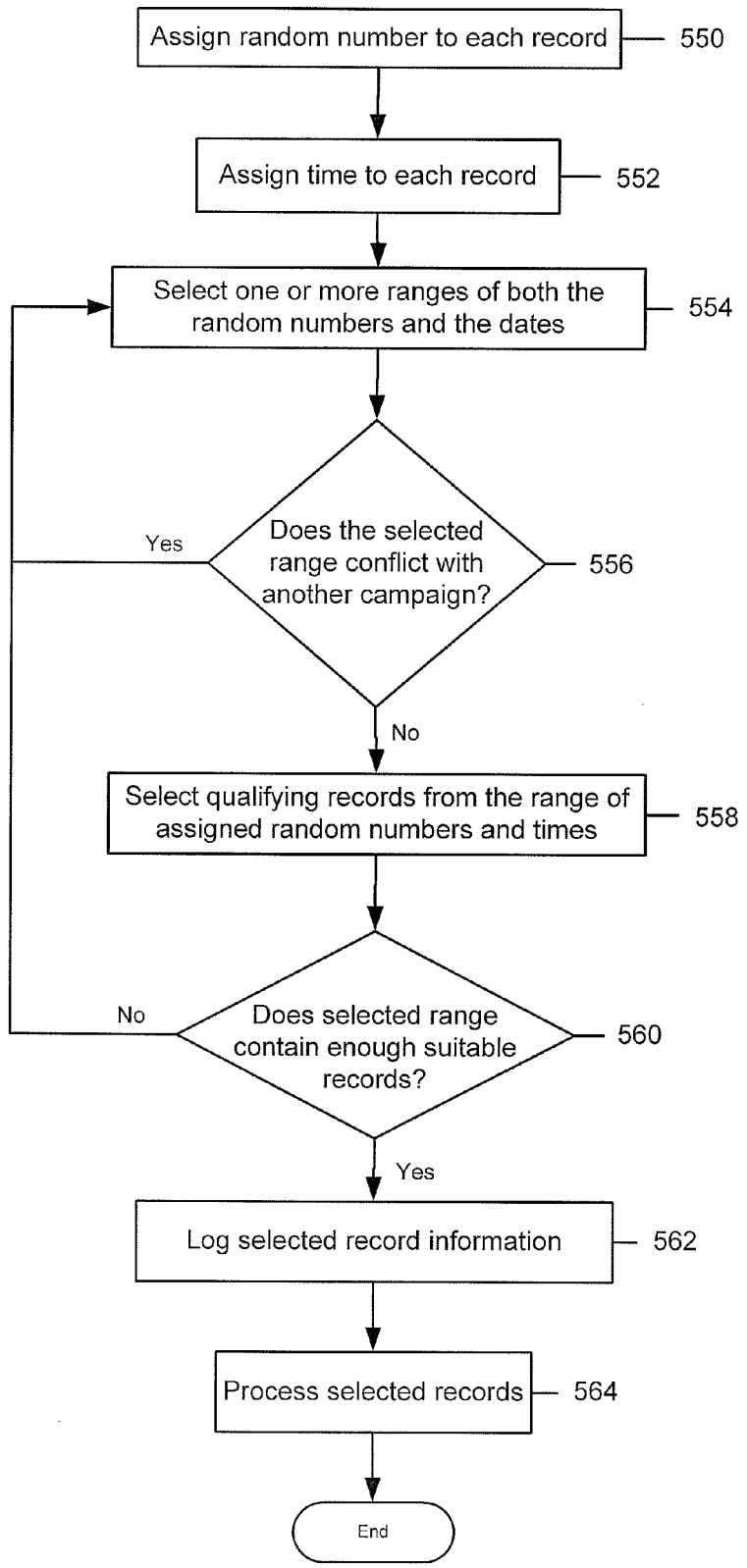
FIG. 11 is flowchart describing a method of one example of target parameter selection ranging using the member server groups of FIGS. 5, 7 and 8.
Figure 12:
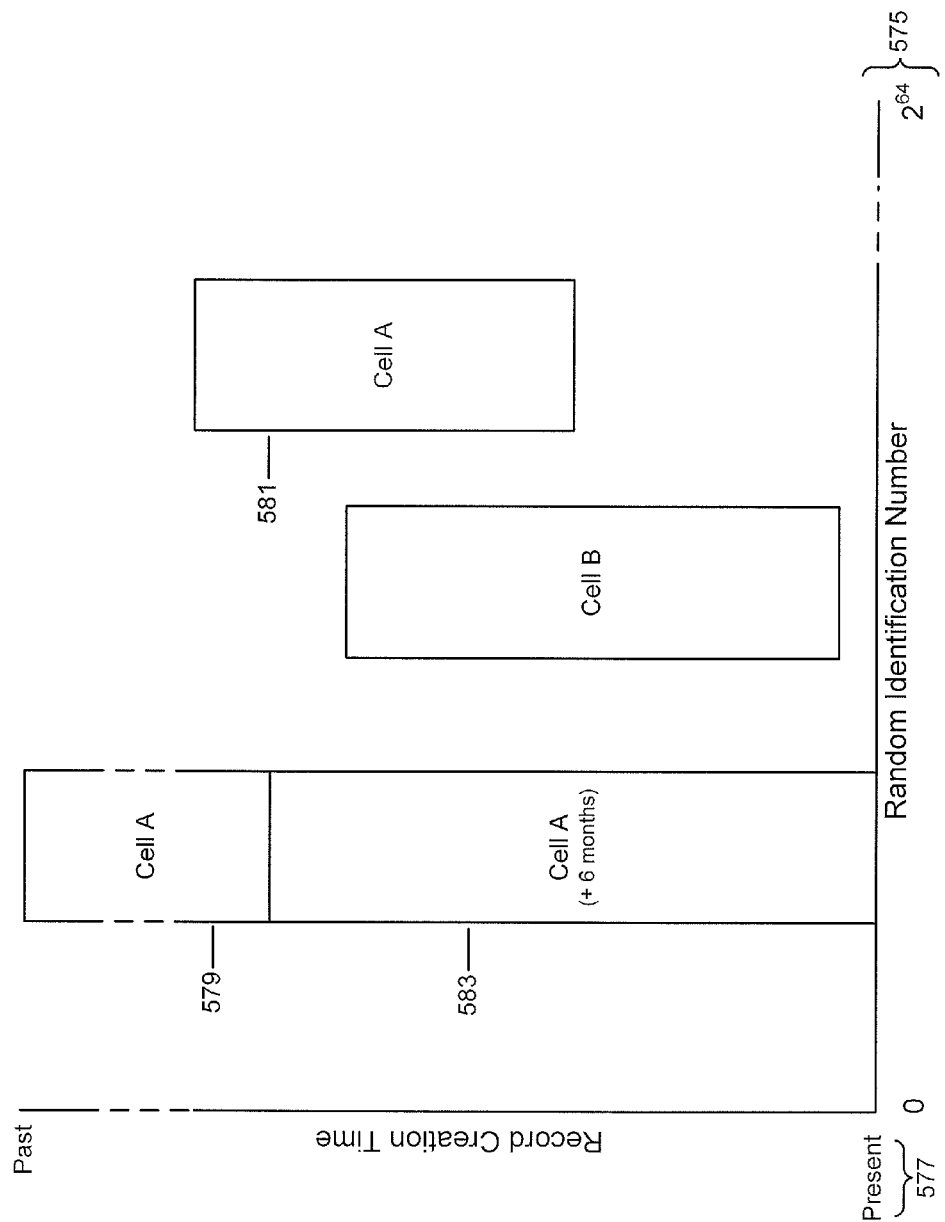
FIG. 12 is another graphical representation of one method of efficient target query selection ranging.

With reference to FIG. 8, FIG. 11, and FIG. 12, a method of selecting disjoint sets of records containing more than one persistent identifier without performing a database join or storing a number of records may be described. A selected range may be identified by more than one persistent identifier to facilitate selecting disjoint record sets from a database that changes over time. Campaign testing or implementation may also include records that may be updated, added, or deleted over the life of the system 400. For example, six months after conducting a first campaign test and selecting a number of members as described above in relation to FIGS. 9 and 10, a marketer may wish to add more members to the campaign. One method of adding another unique set of members may be to exclude the previously-chosen range or ranges of persistent identifiers and select another range. However, the previously-chosen ranges may exclude a large number of the total members so that another range that is exclusive of the previously-targeted ranges will not contain a desired quantity of new records. In the six-month interim, new records may have been added to the system 400 that may have been assigned persistent identifiers within the previously-targeted range(s) of identifiers. Excluding the previously-targeted range(s) would, therefore, also exclude the new records within the old range(s). By assigning a second persistent identifier to all records, a user may harvest the new records from within the previously-targeted ranges. In one embodiment, the second persistent identifier is a time the record was added to the system or modified 400. Selecting a number of qualifying records according to both a random number and a time-associated parameter may also allow a marketer to guarantee, with a high degree of certainty, that members who received the first campaign will not also receive the second campaign.

At step 550, the system 400 may assign a first persistent identifier 575 (FIG. 12) to each record. For example, the first persistent identifier may be a random number between the range of 0 to $2^{64}$.

At step 552, the system may assign a second persistent identifier 577 (FIG. 12) to each record. For example, the second persistent identifier may be a time-associated identifier related to the time of record creation, modification, or any other parameter.

At step 554, the user may select a range 579 (FIG. 12) of both the first and second persistent identifiers. In one embodiment, the user selects a plurality of records corresponding to both a range of the persistent identification number and a period of time. By selecting a range of both persistent identifiers, the user may ensure that records excluded by the first identifier that are suitable for the campaign are able to be selected.

At step 556, the system 400 may determine if the selected range conflicts with another campaign range. If, at step 556, the selected ranges conflict with another previously-targeted range, then the method may return to step 554 to select another set of persistent identifier ranges. Also, if the selected ranges conflict with a previously-targeted range, the system 400 may execute the method described above in relation to FIG. 9. If, at step 556, the selected ranges do not conflict with another campaign, the system 400 may proceed to the next step. At step 558, the user may select the qualifying records that are associated with both persistent identifiers from the selected ranges of persistent identifiers.

At step 560, if a suitable number of records are within the ranges of both persistent identifiers, the method may terminate. If, at step 560, a suitable number of records are not contained within the selected ranges, then the method may repeat steps 554, 556, and 558 to select another range of both parameters 581 and/or another range of only one of the parameters 583 until a suitable number are found. Thus, a suitable number of qualifying records may be selected without excluding all records that have a number of other persistent identifiers.

At step 562, the system 400 may log information associated with the selected records. For example, the system 400 may modify a record parameter that identifies all campaigns or campaign tasks associated with that record. Alternatively, the system 400 may record the ranges of the persistent parameters used in the particular campaign task with other information associated with the campaign. At step 564, the system 400 may process and complete the campaign task without saving a list of records selected by the method.

Additional persistent identifiers may be selected to increase the number of available qualifying records. However, as the number of persistent identifiers associated with the selected record increases, the less random the selection may be. For example, a range of records including persistent identifiers for the random identification number, the creation date, a member's birth date, and social security number may result in specific records that do not exhibit the random qualities usually desired in AB testing or other marketing tasks. By decreasing the number of records contained by the persistent identifiers while increasing the number of ranges, randomness may be maintained.

A marketer using a database system may also wish to re-process a previously-executed campaign task as part of a new campaign task. If the tasks are identical, merely using the same persistent identifier ranges and record parameters from the previous task may include any number of unwanted records that were created or changed during the time between processing the previous task and the new task. However, when a new campaign task requests different database record parameters, the new task may exclude the previous persistent identifier ranges used in the previous campaign task to avoid sending duplicate campaign e-mails to the same members.

When the new task excludes the persistent identifier ranges of a previous task, the new task may exclude all records within the ranges as determined by the method associated with FIGS. 9-12 for that previous task. For example, a previous campaign task may have sent marketing messages to 10,000 potential customers from the system 400. Sometime later, a marketer may wish to retrieve the member records associated with a previous campaign task, execute a campaign task with records that are identical to a previous campaign task, or a combination of changes to the original query that would, in effect, include or exclude the records of the original query. In other words, a marketer may wish to refine or "granulate" a previous campaign task to create another set of records that is related to a first set of previously-targeted members.

For example, a new marketing campaign task requires targeting 100,000 Canadian males. A previous campaign task targeting records with a different parameter may have included a range of records that, although unneeded, included a number of the Canadian male records that are now needed for the new campaign task. Merely selecting a different range of records may, therefore, exclude a number of needed records that are essentially "trapped" within the old campaign task record range. If the system 400 contains 150,000 records having the Canadian male parameter, the new task requires 100,000 Canadian male records, and the old task includes a range of records that inadvertently traps 60,000 of the total 150,000 Canadian male records, then selecting any range outside of the old task range could include, at most, 90,000 Canadian male records. Therefore, the additional 10,000 Canadian male records needed for the new task must be retrieved from the old campaign task range.

Figure 13:
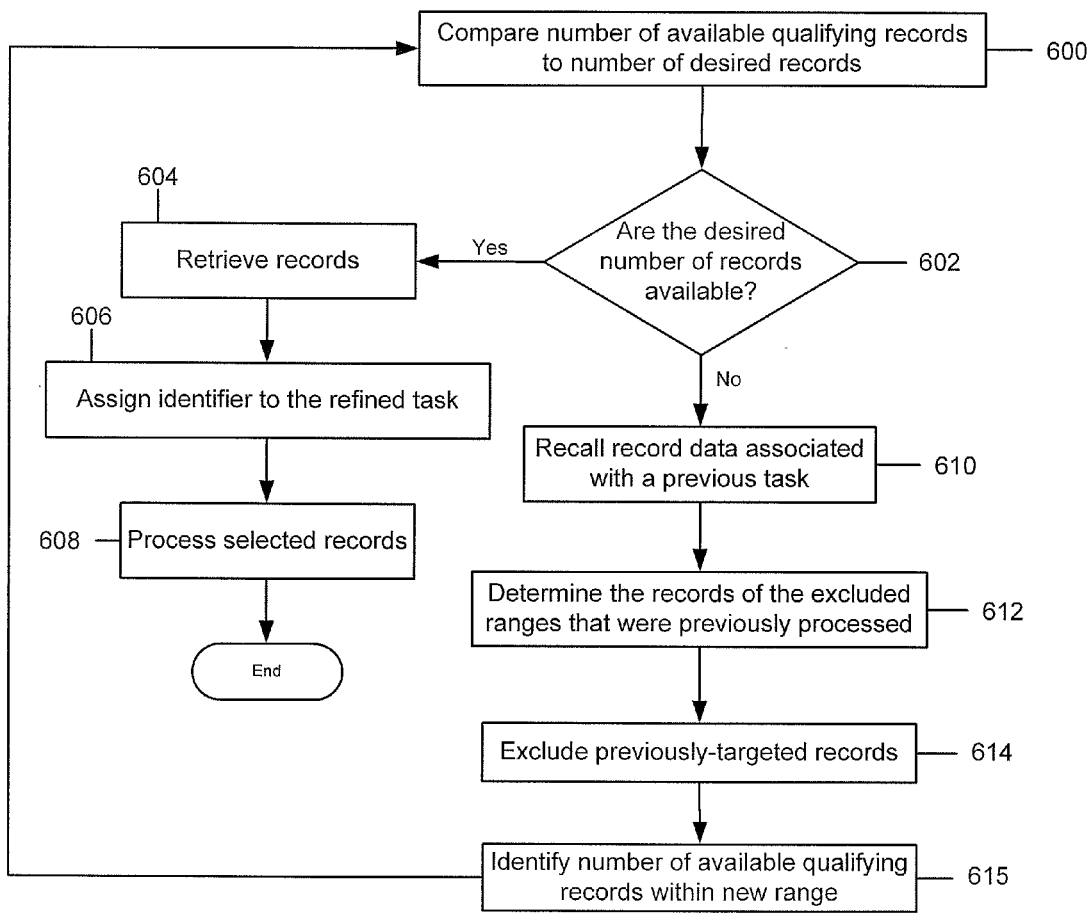
FIG. 13 is a flowchart describing a method of refining and selecting data repository members.

With reference to FIG. 8 and FIG. 13, a method for retrieving records for new marketing campaign tasks from within persistent identifier ranges of previous tasks may be described. At step 600, the system 400 may compare the number of available qualifying records to the number of desired records. The number of available qualifying records may be the total number of records in the system 400 excluding those records that are contained within any previously-identified range of record identifiers (as described in relation to FIGS. 9-12) associated with a previous task. The number of desired records may be the total number of records required for the new task.

If, at step 602, the number of desired records are available despite the exclusion of the old task record ranges, then, at step 604, the system may retrieve the records as described above in relation to FIGS. 9-12. Because some system or campaign task records may be removed or may become otherwise inaccessible during the interim between the original query and a subsequent query, the set of records retrieved at step 604 may not be identical to the set of records retrieved for the original campaign task. For example, the original set of records may have included a number of invalid e-mail address that were never corrected, a number of records associated with members that opted out of the system, or any other situation in which an attempt to reconstruct a previous task set of records may be impossible. In one embodiment, the set of records retrieved at step 604 may be substantially similar to an original campaign task. Regardless of the number of original task records that are no longer present in the system, the method may return the current system records that were members of the original campaign task.

At step 606, the system 400 may assign a campaign identifier or other parameter to the refined task so that a user may access the same database records without retrieving warehoused data and more generally refer to the refined data set when designing future campaign tasks. In one embodiment, the campaign identifier is added to the retrieved database records for each campaign task that was within the selected record range. The campaign identification may then be used as part of a Boolean expression to further refine the search for later tasks. In a further embodiment, the campaign identifier expires after a period of time depending on a projected need for the campaign in the future, a requesting party's needs, or other criteria. Adding the campaign identifier to a record may allow identification of previously-targeted members as individual records without recording all campaign actions associated with that record. For example, rather than preserving every action taken with each record during the course of a campaign, a campaign identifier may identify a record as being associated with all campaign actions. Thus, a system 400 user may create a list of records associated with each campaign task without preserving each action taken with each record during the course of the campaign. At step 608, the system 400 may process the records by sending the new campaign task to the recipients indicated in the retrieved database records.

If, at step 602, the desired number of records are not available when the previously-targeted record ranges are excluded, then at step 610, the system 400 may recall database record data associated with the previous task. The system 400 may also recall a version of the database records as they existed at the time of the previous task. The older data may be part of the data warehouse system 434 or another portion of the system 400. In one embodiment, the system 400 includes a current table including each member's existing demographic and other data as well as a historical table that may preserve an indication of the time a member added a record to the system 400 or modified any parameter of the system 400. For example, the historical table may include a date/time stamp for changes to any demographic data or record parameter, an account creation date associated with a member or record, a previous campaign task identification, a date/time stamp for a previous campaign task, and a persistent identifier range associated with a previous campaign task. The historical table may comprise a complete archive of any record changes and may be stored in parallel to a current table of the system. A current table may include demographic data and records depicting the members' most up-to-date view of an associated record. For example, at step 610, current system 400 queries to establish a number of records for a campaign task may be gathered from the current table while queries to re-create or "granulate" a previous campaign task may be gathered from the historical table.

At step 612, the system 400 may identify the current records in the previously-targeted range(s) that were processed as part of the previous task. As database records may change over time, the system 400 may compare the data associated with the previous task (as retrieved at step 610) to the data currently contained within the database records to identify the previously-targeted records.

At step 614, the previously-targeted records may be excluded from the current marketing campaign task. At step 615, any new qualifying records within the previously-targeted range may be identified and added to the total number of available qualifying records for this particular campaign task. The method may then return to step 600 to compare the new total number of available records with the number of desired records as before, repeating the method steps as necessary. Therefore, a previous campaign task may be refined to include needed database records while excluding previously-targeted records to, thereby, create mutually exclusive sets of database records.

The steps as described above and illustrated in FIG. 13 may be performed on each silo 410, 412 (FIG. 8). In one embodiment, the steps described above are parallelizable and scalable. For example, the records associated with a previous campaign task may be collected from each silo 410, 412 by a system application program executing on the silo application server 414.

The system 400 may also implement a method for accurately tracking incoming returned or "bounced" e-mail messages and determining several parameters about each individual bounced e-mail message from information encoded in the message header. Further, the method may encrypt parameter information into the e-mail message header to calculate parameter-specific statistics, predict future bounce rates, and filter unsolicited or "spam" e-mail that may be mistaken as a bounced message. For example, as previously described, the system may send a number of e-mail messages to members as part of a campaign task. Due to any number of errors, such as a member incorrectly entering an e-mail address, a member's mailbox becoming full or otherwise rejecting the campaign task e-mail, or a number of other situations, one or more of the e-mail messages sent during a campaign may be returned. In one embodiment, a method may determine the original, intended recipient of a bounced e-mail message after it has been forwarded from the intended recipient's address to another address. In a further embodiment, the method may determine the original, intended recipient of a campaign task e-mail when the member modifies his e-mail address after the system sends the campaign task e-mail, but before the message bounces back to the system. In a still further embodiment, the method may determine other information from the bounced message, for example, the campaign task identification or other information. Also, the system may execute the method without inadvertently including unsolicited e-mail messages as bounces. For example, unsolicited e-mail, spam, or any message that did not originate from the system 400 as a marketing campaign e-mail, may inadvertently or maliciously be sent to the system 400. The system 400 may, therefore, accurately identify incoming bounced e-mails as originating from the system and identify common parameters and statistics about the bounced messages to improve future campaigns while filtering out spam.

Figure 14:
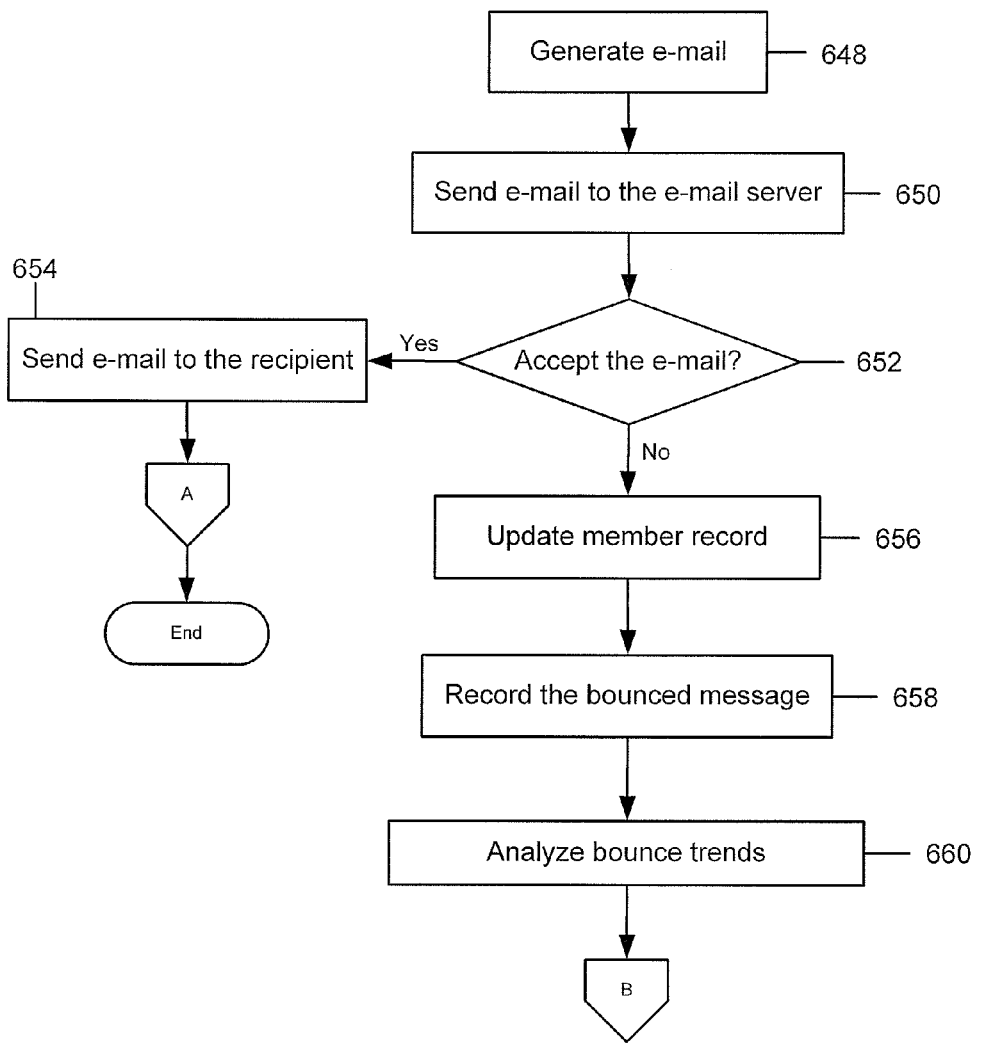
FIG. 14 is a flowchart describing a system and method for spam-proof e-mail bounce tracking.

With reference to FIG. 8 and FIG. 14, a processed e-mail message may be bounced before it leaves the e-mail relay system 448 or any of the e-mail servers 451, 452, 454, 456. At step 648 (FIG. 15), the system 400 may generate an e-mail associated with a database record and a campaign task. The system 400 may modify the e-mail message header to include specific information or a reference to information about the message's origin. For example, the system 400 may modify the message header to include encrypted information to identify the campaign task, the targeted member, or any other information or a reference to information that may facilitate tracking and analyzing e-mail bounces in a demographic information gathering and incentive award system. Furthermore, the return path may be modified to indicate an address to send a bounced message. A modified or encrypted portion of the return path or any other part of the message header may identify the marketing campaign, member, and any other information that may be associated with the originating task to include an e-mail domain of the recipient or the IP address of the sending server. In one embodiment, the system 400 may set each outgoing e-mail sender account name to a set length of random-looking characters followed by the address of the bounce server including the computer name, sub-domain, and domain. The bounce server may be any one of the e-mail servers 451, 452, 454, 456. In one embodiment, a resulting sender account name is a 26 character string followed by the bounce server location, for instance, "4FG32G6D763HJE43982F3JR6HJ@b.mypoints.com" where "b.mypoints.com" indicates the system 400 bounce server. The random-looking account name portion of the bounce e-mail address may be any length suitable for encoding information.

Figure 16:
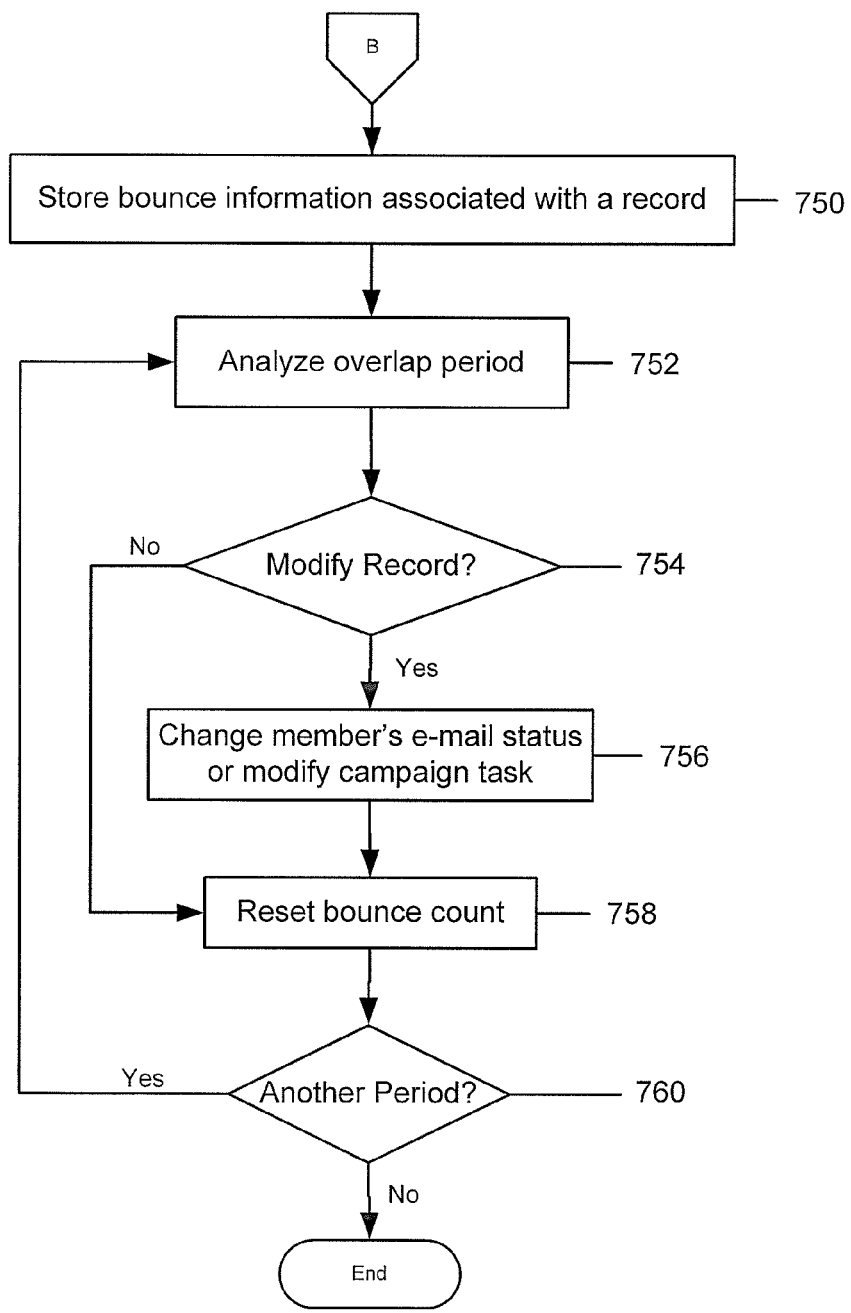
FIG. 16 is still another flowchart describing a system and method for spam-proof e-mail bounce tracking.

At step 650, the system 400 may send an e-mail to the e-mail relay system 448 to be sent out to a member as part of a marketing campaign. The system 400 also increments two count variables, for example, SentCount1 and SentCount2, that are associated with each member record. If, at step 652, the e-mail relay system 448 accepts the e-mail, at step 654, the system 400 may send the e-mail to the proper recipient and continue the method associated with FIG. 16. However, if, at step 652, the e-mail relay system 448 rejects or bounces the e-mail, the system 400 may, at step 656, update the member record associated with the e-mail. For example, the system 400 may add information to the originating member record indicating that the e-mail relay system 448 could not process the e-mail as well as the content of the message. In one embodiment, the system increments two bounce variables, for example, BounceCount1 and BounceCount2, within each record that includes an e-mail address resulting in a bounced message at the e-mail relay system 448. The added information may allow identification and repair of the originating member record so that future messages may be sent to the member. The updated sent and bounce variables may be used to reliably conclude that an e-mail address is not valid.

At step 658, the system 400 may record the bounced message. For example, the system 400 may keep track of a number of messages rejected by the e-mail relay system 400 as well as a cause for the rejection. At step 660, over a period of time, a user may notice trends or sources of e-mail failures and modify aspects of the member record or the system 400 to remedy the problem.

Figure 15:
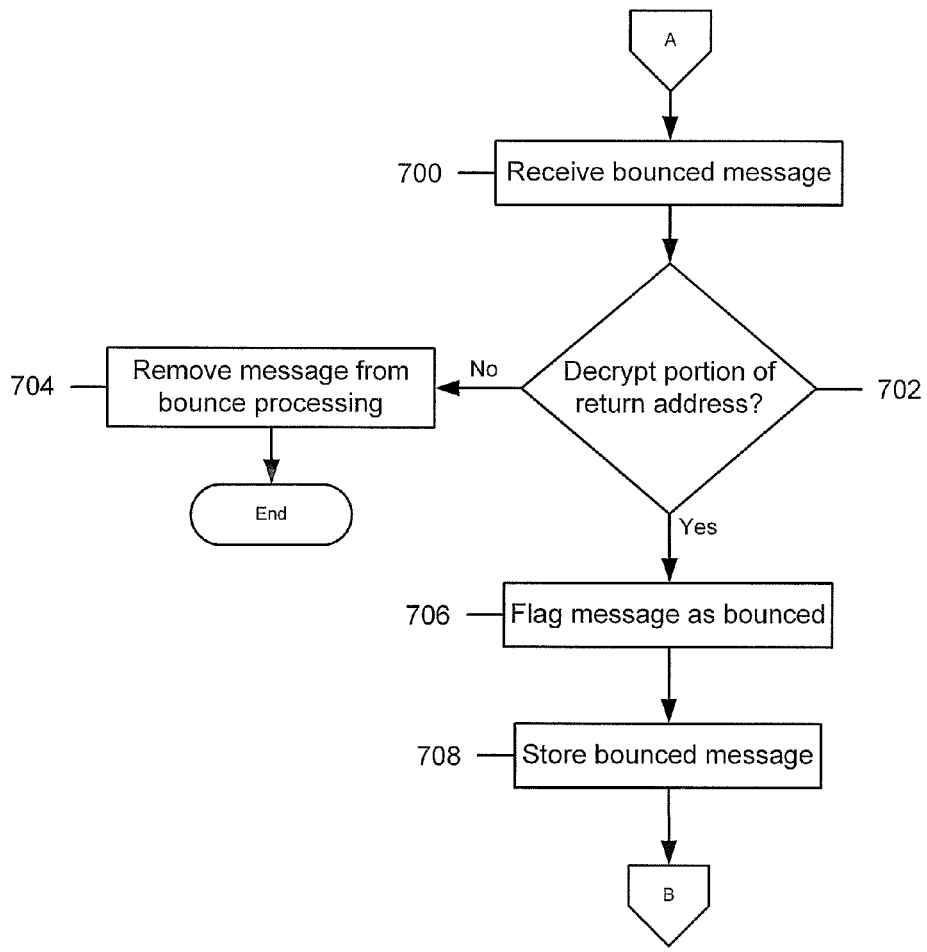
FIG. 15 is a flowchart describing another system and method for spam-proof e-mail bounce tracking.

With reference to FIG. 8 and FIG. 15, the system 400 may accurately track e-mails that are accepted by the e-mail relay system 448, but are bounced back without reaching the intended recipient. The e-mail may return to the e-mail relay system 448 with the unique sender address generated at step 648 of FIG. 15. At step 700, the system 400 may receive a bounced message. At step 702, the system 400 may decrypt the random-looking portion of the return path address or any other encrypted portion of the returned message. As discussed in relation to step 648 (FIG. 15), the information contained in the encrypted may allow the system to track any information associated with the originating e-mail including any member demographic information, a member e-mail address, campaign information, campaign task information, an e-mail domain associated with each bounced message, an IP address of the sending server, or other information. If, at step 702, the system is unable to decrypt the bounce address, at step 704, the message is removed from bounce processing. For example, the system 400 may send the message to a spam folder for later examination, or may delete the message entirely. Messages sent to the spam folder may be examined to determine an originating domain or other information. If, at step 702, the system 400 is able to decrypt the return path or other header information, at step 706, the message information may be flagged as bounced. At step 708, the bounced message may be stored for later analysis as described in relation to step 660 (FIG. 14).

With reference to FIG. 8, and FIGS. 14-18, the data retrieved from a bounced message may be recorded and analyzed. Information from bounced e-mails may be aggregated and compared over different time periods to account for trends or system 400 failures. Particularly, the number of bounced messages associated with a member, a campaign, an e-mail domain, or a sending IP address may indicate problems associated with aspects of the system 400 or record parameters. At step 750, information may be stored as a running total of messages sent and bounces received for a particular record. The send and bounce information may be collected as previously described in relation to steps 650 and 656 (FIG. 14), The running totals may represent the sent and bounced e-mail information for a readily-identifiable period of time, such as a month. For example, information may be segregated by the types and frequencies of e-mail the member normally receives. For those members who are sent e-mail only sporadically, such as those members only receiving administrative e-mails, the system 400 may store several overlapping periods of data as the running total. Increasing the number of overlapping periods may increase the significance of a bounce count for members receiving infrequent e-mails by increasing the total number of sent e-mail messages for comparison against the number of bounces. For a member receiving regular e-mails, the running total may be stored for fewer overlapping periods.

Figure 17:
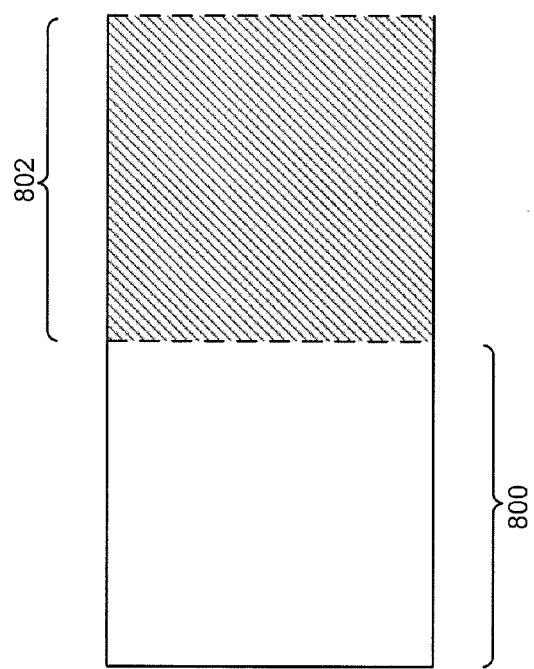
FIG. 17 is a graphical representation of a method for spam-proof e-mail bounce tracking.
Figure 18:
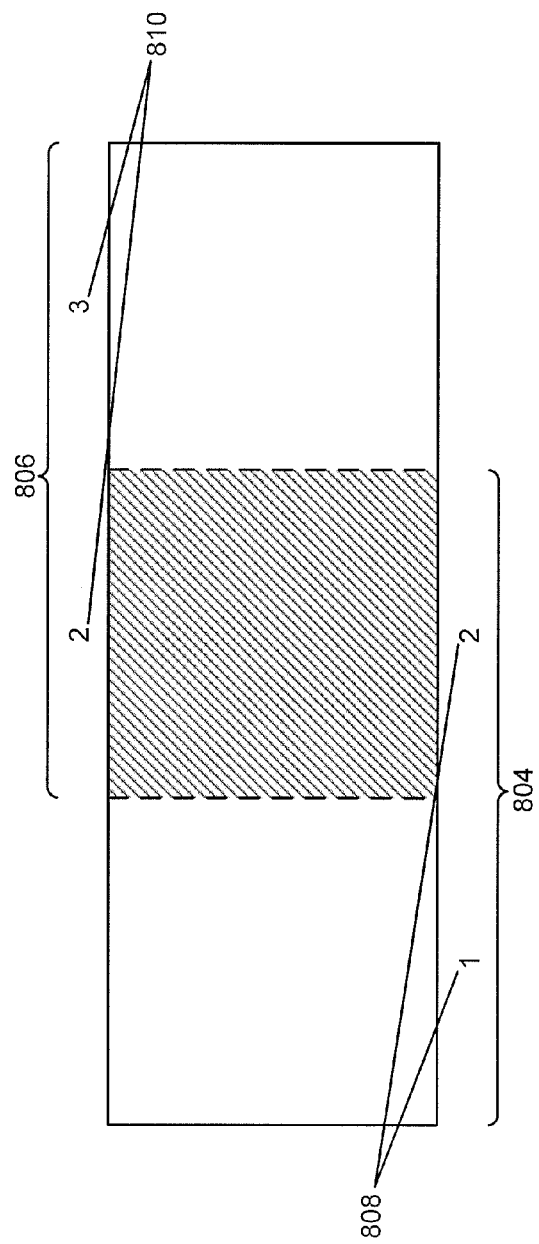
FIG. 18 is another graphical representation of a method for spam-proof e-mail bounce tracking.

As illustrated in FIG. 17, two running total periods 800, 802 may result in a number of sent e-mails and a number of bounces associated with each member. The system 400 may keep track of more than one set of periods 800, 802 and may also increase or decrease the period of time to record the running total. The system 400 may record an error description returned by a remote mail server for each member as part of the running total. Further, the system 400 may store a number of the most recently-bounced messages and a random sampling of older messages. As the running total accumulates new bounce messages, the system 400 may drop older bounced messages while preserving a random selection of the older messages. Historical records of the bounced messages may allow further diagnosis of mail delivery problems associated with a particular member, members at a particular domain, e-mails sent from a particular IP address, e-mails sent for a particular campaign, or for the system as a whole.

At step 752, the periods 800, 802 may be analyzed to determine which records may be modified to remedy the bounce problem. In one embodiment, the system 400 compares a ratio of sent messages versus bounced messages for a first time period 800 to a threshold number. If, at step 754, the analysis indicates that a record should be modified, then, at step 756, the system 400 may change a member's e-mail status or perforin other actions within the campaign task to compensate for a historical number of bounced e-mails. For example, the system 400 may modify a record to an "unmailable status" and may increase the number of e-mails to be sent during the campaign by at least one record to account for the unmailable status change of the record. At step 758, both the sent and bounced message count for the first time period may be reset to zero. In one embodiment, the bounce and send count may also be reset either before or after a member provides an updated e-mail address or after the member's e-mail status is set to unmailable. For example, a member Y may have address x1@aol.com (i.e., address "1" for the member Y). Member Y may change his address to x23@aol.com (i.e., address "2" for the member Y). The database system 400 may send an email Z to x23@aol.com and include Y and "2" in the encrypted identifier as discussed in relation to step 648. Member Y may change his address to x47@aol.com. The system 400 may receive a return or "bounce" of email Z and decrypt the identifier as discussed above. The decrypted information may identify that the e-mail was originally sent to member Y with address "2", and, while the system 400 may store the history of e-mail address changes for member Y, the system 400 may identify that the email address was x23@aol.com, and that the member's current email address no longer matches. The system may then not increment the bounce count upon receiving the bounced e-mail Z.

In a further embodiment, the system 400 may not store the history of email address changes for the member, yet still match a bounced e-mail to a member that has changed his e-mail address since the system sent the original message. For example, when a member record is first created at block 290 (FIG. 6), the system may initialize an address counter to zero. Each time the member's email address changes, the system 400 may increment the address version counter. When the system 400 sends an e-mail to a member, the system may include in the encrypted identifier (as discussed at block 648, FIG. 14), the current address version counter value. The sent message may bounce and the system may decrypt the bounced message header as discussed at block 702, may identify the address version from the decrypted header, and may compare the address version counter with the member's current address version counter. If they differ, the system 400 may not count the bounced message in the return count because the member's email address may have changed in the interrim.

The address version counter may have a maximum value which wraps back around to zero when it is reached and further incremented. The maximum value may limit the maximum number of times a member could change their email address in between a sent message and the return of the same message. However, it may be unlikely that the limit is reached even when that limit is set to a small amount (for example 256, i.e. one byte of information) during the typical time a message may be returned to the system 400.

If, at step 760, the system 400 determines that another period 800 needs to be analyzed to reliably conclude that an e-mail address is not valid, the system 400 may return to step 752 to analyze the send and bounce counts for a second, later time period 802, as described above.

The system 400 may also determine that another time period analysis is needed for a variety of factors. For example, if the total number of sent e-mails for any period is not high enough to indicate the reliability of the address, then the system 400 may expand the period of analysis to several months or perform the analysis in order to meet a threshold number of e-mails sent. For example, with reference to FIG. 18, the system may analyze two periods 804, 806 consisting of two months each 808, 810 that may result in a number of sent and bounced messages associated with each member. The system 400 may keep track of more than one set of overlapping periods 804, 806 and may also increase or decrease the period of time.

Separately, the system 400 may keep other running totals, each recording bounce information for one year and overlapping by six months. The system 400 may record an error description returned by a remote mail server for each member as part of the running total. Further, the system 400 may store a number of the most recently-bounced messages and a random sampling of older messages. As the running total accumulates new bounce messages, the system 400 may drop older bounced messages while preserving a random selection of the older messages.

Historical records of the bounced messages may allow further diagnosis of mail delivery problems associated with a particular member, members at a particular domain, e-mails sent from a particular IP address, e-mails sent for a particular campaign, or for the system as a whole. For example, historical data may predict that a campaign task may receive a percentage of bounced e-mails from the number of selected records. Excluding the predicted number of bounced e-mails, a campaign task may not succeed in reaching a desired number of members. Therefore, the task may be modified to compensate for the predicted number of bounced messages so that the desired number of members are actually reached for a campaign task. A member record may be modified if it is determined to have too many bounced e-mails during the period analyzed. For example, if the system received eight bounce messages for a record that was sent a total of ten messages during a period, the system 400 may determine that the record should be modified to remedy the bounce problem. As previously discussed, the record's status may be changed so that it does not receive any more e-mails. For example, the record status may be changed to indicate an "unmailable" condition or any other problem associated with e-mail delivery. In one embodiment, a record's status may be changed upon the occurrence of some threshold event. For example, during any period of counting bounced e-mails, 80% of the messages may be bounced in order for the message status to change to unmailable. The threshold event may also be modified based on empirical data to account for situations wherein a bounced message does not return to the bounce server or is not otherwise counted. Other algorithms to determine the threshold event may include other bounce statistics and variables leading to a change of the member's status.

If, at step 754, the system 400 determines that a record may not be modified, the system 400 proceeds to step 758, the sent and bounce messages count associated with the periods analyzed in step 752 may be reset to zero, and the system 400 may proceed to step 760 as discussed above. Therefore, from period to period, the system 400 may compare the number of sent messages and bounced messages in various time periods to the number of unmailable addresses within the system to, thereby, account for the shortcoming in future e-mail campaigns.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method for tracking returned messages in a database system comprising:

encrypting at least a portion of a record of the database system into a message identifier;

generating a message including the encrypted message identifier within a return path of the message, wherein the message identifier associates the message with the record;

sending the message from the database system to an e-mail address associated with the database record;

receiving a return of the sent message including the encrypted message identifier within the return path of the returned message;

determining if the encrypted message identifier within the return path of the returned message can be decrypted; and identifying the returned message as an unsolicited message if it is determined that the encrypted message identifier within the return path of the returned message cannot be decrypted.

2. The method of claim 1, wherein generating the message including the encrypted message identifier within the return path of the message comprises:

encrypting at least one of the e-mail address associated with the database record or a campaign task into a character string; and modifying the return path of the message with at least one of a return address including the character string or an address corresponding to a database system returned message server.

3. The method of claim 2, wherein the returned message includes the character string.

4. The method of claim 1, further comprising identifying at least one of the database record and a campaign task associated with the returned message.

5. The method of claim 1, further comprising discarding the unsolicited message.

6. The method of claim 1, further comprising:

incrementing a number of sent messages for the database record upon sending the message from the database system to the e-mail address associated with the database record; and incrementing a number of returned messages for the database record upon receiving the return of the sent message if it is determined that the encrypted message identifier can be decrypted.

7. The method of claim 6, further comprising:

determining a first number of sent messages during a first time period;

determining a first number of returned messages from the first number of sent messages during the first time period;

determining a second number of sent messages during a second time period; and determining a second number of returned messages from the second number of messages during the second time period;

wherein the second number of sent messages includes at least a portion of the first number of sent messages; and wherein the second number of returned messages includes at least a portion of the first number of returned messages.

8. The method of claim 7, wherein the first time period and the second time period include an overlapping time period;

sending the portion of the first number of sent messages included with the second number of sent messages during the overlapping time period; and receiving the portion of the first number of returned messages included with the second number of returned messages during the overlapping time period.

9. The method of claim 7, further comprising:
determining a first ratio of the first number of returned messages versus the first number of sent messages;
resetting to zero the first number of sent messages and the first number of returned messages;
determining a second ratio of the second number of returned messages versus the second number of sent messages; and
resetting to zero the second number sent messages and the second number of returned messages.

10. The method of claim 9, further comprising:
changing a status of the database record upon an occurrence of at least one of:
determining the first ratio is below a threshold;
determining the second ratio is below the threshold; and
validating the e-mail address associated with the database record;
wherein the status is one of mailable or unmailable.

11. The method of claim 6, further comprising:
modifying the e-mail address associated with the database record;
receiving the returned message after modifying the e-mail address;
determining if the e-mail address of the returned message matches the modified e-mail address;
if the e-mail address of the returned message matches the modified e-mail address, excluding the returned e-mail message from the number of returned messages for the database record; and
if the e-mail address of the returned message does not match the modified e-mail address, incrementing the number of returned messages for the database record.

12. The method of claim 11, further comprising:
initializing an e-mail address version counter, wherein the database record includes the e-mail address version counter;
incrementing the e-mail address version counter after modifying the e-mail address associated with the database record;
encrypting the e-mail address version counter with the message identifier;
comparing the e-mail address version counter from the decrypted message identifier to a current version of the e-mail address version counter from the database record;
if the e-mail address version counter from the decrypted message identifier matches the current version of the e-mail address from the database record, excluding the returned e-mail message from the number of returned e-mail messages for the database record; and
if the e-mail address version counter from the decrypted message identifier does not match the current version of the e-mail address from the database record, incrementing the number of returned messages for the database record.

13. The method of claim 11, further comprising storing a history of the modifications to the e-mail address associated with the database record, the history including at least one previous version of the e-mail address associated with the database record;
wherein associating the e-mail address of the returned message with the database record having the modified e-mail address includes:
accessing the history of modifications to the e-mail address; and
determining if a previous version of the e-mail address associated with the database record matches the e-mail address of the returned message.

14. A method for analyzing an e-mail that is returned to a database system in response to the database system sending the e-mail, the method comprising:
encrypting a portion of a database record into a character string;
inserting the character string into a message return path;
sending a message including the character string to an e-mail address associated with the database record;
incrementing a first number of sent messages during a first period of time;
receiving a return of the sent message at the database system during the first period of time;
incrementing a first number of returned messages during the first period of time;
determining if the character string can be decrypted;
discarding the returned message if it is determined that the character string cannot be decrypted;
decrypting the character string if it is determined that the character string can be decrypted;
incrementing a second number of sent messages during a second period of time, wherein the second number of sent messages includes a portion of the first number of sent messages;
incrementing a second number of returned messages over the second period of time, wherein the second number of returned messages includes a portion of the first number of returned messages;
determining a first ratio of the first number of returned messages versus the first number of sent messages;
resetting to zero the first number of sent messages and the first number of returned e-mail messages;
determining a second ratio of the second number of returned messages versus the second number of sent messages;
resetting to zero the second number of sent messages and the second number of returned messages; and
changing a status of the database record upon an occurrence of at least one of:
determining the first ratio is below a threshold,
determining the second ratio is below the threshold, and
validating the e-mail address associated with the database record;
wherein the status is at least one of mailable or unmailable.

15. The method of claim 14, wherein the character string encrypts at least one of member demographic information, a member e-mail address, e-mail campaign information, a member identifier, an e-mail address version number, or campaign task information.

16. The method of claim 14, further comprising:
modifying the e-mail address associated with the database record;
resetting to zero the first number of sent messages, the first number of returned messages, the second number of sent messages, and the second number of returned messages after modifying the e-mail address associated with the database record;
receiving the returned message after modifying the e-mail address;
determining if the e-mail address of the returned message matches the modified e-mail address;
if the e-mail address of the returned message matches the modified e-mail address, excluding the returned message from the first and second number of returned messages for the database record; and if the e-mail address of the returned message does not match the modified e-mail address, incrementing the first and second number of returned messages for the database record.

17. A computing system for analyzing returned e-mails in a database system including a non-transitory computer-readable storage medium containing computer-executable instructions stored therein for:
  encrypting at least a portion of a record of the database system into a message identifier; generating a message including the encrypted message identifier within a return path of the message, wherein the message identifier associates the message with the record; sending the message from the database system to an e-mail address associated with the database record; receiving a return of the sent message including the encrypted message identifier within the return path of the returned message; determining if the encrypted message identifier within the return path of the returned message can be decrypted; and identifying the returned message as an unsolicited message if it is determined that the encrypted message identifier within the return path of the returned message cannot be decrypted.

18. The computing system of claim 17, comprising further computer-executable instructions for:
  incrementing a number of sent e-mail messages for the database record upon sending the message from the database system to the e-mail address associated with the database record; and
  incrementing a number of returned e-mail messages for the database record upon receiving the returned message including the message identifier within the return path of the returned message if it is determined that the encrypted message identifier can be decrypted.

19. The computing system of claim 18, comprising further computer-executable instructions for:
  determining a first number of sent e-mail messages during a first time period;
  determining a first number of returned e-mail messages from the first number of sent e-mail messages during the first time period;
  determining a second number of sent e-mail messages during a second time period; and
  determining a second number of returned e-mail messages from the second number of e-mail messages during the second time period;
  wherein the second number of sent e-mail messages includes at least a portion of the first number of sent e-mail messages; and
  wherein the second number of returned e-mail messages includes at least a portion of the first number of returned e-mail messages.

20. The computing system of claim 19, comprising further computer-executable instructions for analyzing the returned e-mail message without saving the returned message to the database system.

21. The computing system of claim 19, comprising further computer-executable instructions for:
  determining a first ratio of the first number of returned e-mail messages versus the first number of sent e-mail messages;
  resetting to zero the first number of sent e-mail messages and the first number of returned e-mail messages;
  determining a second ratio of the second number of returned e-mail messages versus the second number of sent e-mail messages;
  resetting to zero the second number of sent e-mail messages and the second number of returned e-mail messages; and
  changing a status of the database record upon an occurrence of at least one
    determining the first ratio is below a threshold;
    determining the second ratio is below the threshold; and
    validating the e-mail address associated with the database record;
  wherein the status is at least one of mailable or unmailable.

22. The computing system of claim 18, comprising further computer-executable instructions for:
  modifying the e-mail address associated with the database record;
  receiving the returned message after modifying the e-mail address;
  determining if the e-mail address of the returned message matches the modified e-mail address;
  if the e-mail address of the returned message matches the modified e-mail address, excluding the returned e-mail message from the number of returned messages for the database record; and
  if the e-mail address of the returned message does not match the modified e-mail address, incrementing the number of returned messages for the database record.

23. The computing system of claim 22, comprising further computer-executable instructions for:
  initializing an e-mail address version counter, wherein the database record includes the e-mail address version counter;
  incrementing the e-mail address version counter after modifying the e-mail address associated with the database record;
  encrypting the e-mail address version counter with the message identifier;
  wherein analyzing the returned message comprises comparing the e-mail address version counter from the decrypted message identifier to a current version of the e-mail address version counter from the database record;
  if the e-mail address version counter from the decrypted message identifier matches the current version of the e-mail address from the database record, excluding the returned e-mail message from the number of returned e-mail messages for the database record; and
  if the e-mail address version counter from the decrypted message identifier does not match the current version of the e-mail address from the database record, incrementing the number of returned messages for the database record.

24. The computing system of claim 22, comprising further computer-executable instructions for:
  storing a history of the modifications to the e-mail address associated with the database record, the history including at least one previous version of the e-mail address associated with the database record;
  wherein associating the e-mail address of the returned message with the database record having the modified e-mail address includes:
    accessing the history of modifications to the e-mail address; and
    determining if a previous version of the e-mail address associated with the database record matches the e-mail address of the returned message.

* * * * *